US012743976B2

(12) United States Patent
Cho et al.

(10) Patent No.: US 12,743,976 B2
(45) Date of Patent: Sep. 22, 2026

(54) METHOD FOR COMPENSATING TEMPERATURE AND DISPLAY APPARATUS

(71) Applicant: LG Display Co., Ltd., Seoul (KR)

(72) Inventors: Hwi Seong Cho, Paju-si (KR); Sun Hwan Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/251,297

(22) Filed: Jun. 26, 2025

(65) Prior Publication Data

US 2026/0031007 A1 Jan. 29, 2026

(30) Foreign Application Priority Data

Jul. 25, 2024 (KR) ........................ 10-2024-0098329

(51) Int. Cl.
*G09G 3/00* (2006.01)
*G09G 3/32* (2016.01)

(52) U.S. Cl.
CPC ............... *G09G 3/006* (2013.01); *G09G 3/32* (2013.01); *G09G 2300/0842* (2013.01); *G09G 2300/0861* (2013.01); *G09G 2320/041* (2013.01)

(58) Field of Classification Search
CPC .. G09G 3/006; G09G 3/32; G09G 2300/0842; G09G 2300/0861; G09G 2320/041
See application file for complete search history.

(56) References Cited

U.S. PATENT DOCUMENTS

| | | | | |
|---|---|---|---|---|
| 11,417,265 B2 | 8/2022 | Seo et al. | | |
| 2005/0068277 A1* | 3/2005 | Salsman | ............. | G09G 3/3611 345/87 |
| 2010/0301777 A1* | 12/2010 | Kraemer | ............. | H05B 45/325 315/312 |
| 2017/0171925 A1* | 6/2017 | Rufo Torres | ............. | H03K 7/08 |
| 2025/0087141 A1* | 3/2025 | Huh | ......................... | G09G 3/32 |

FOREIGN PATENT DOCUMENTS

| | | |
|---|---|---|
| KR | 10-2697930 B1 | 8/2024 |

* cited by examiner

*Primary Examiner* — Rodney Amadiz
(74) *Attorney, Agent, or Firm* — Seed Intellectual Property Law Group LLP

(57) ABSTRACT

The present application relates to a method for compensating temperature and a display apparatus. The method for compensating temperature may include: setting an on-pulse width of an emission signal according to luminance of pixels based on optical compensation; generating first and second linear function graphs by measuring luminance according to the on-pulse width of the emission signal set at first and second temperatures; generating a target linear function graph relating the on-pulse width of the emission signal set at a target temperature and luminance based on the first and second linear function graphs; and adjusting the on-pulse width of the emission signal set based on the target linear function graph.

21 Claims, 24 Drawing Sheets

METHOD FOR COMPENSATING TEMPERATURE AND DISPLAY APPARATUS

CROSS-REFERENCE TO RELATED APPLICATION

This application claims priority to and the benefit of Korean Patent Application No. 10-2024-0098329, filed on Jul. 25, 2024, the disclosure of which is incorporated herein by reference in its entirety.

BACKGROUND

Technical Field

The present specification relates to a method for compensating temperature and a display apparatus.

Description of Related Art

Display devices are being employed in a variety of electronic devices such as TVs, mobile phones, laptops, and tablets.

A display device includes an organic light-emitting display (OLED) that emits light by itself and a liquid crystal display (LCD) that requires a separate light source.

In recent, a display device including a light-emitting element such as a light-emitting diode (LED) has attracted attention as a next-generation display device. Since the light-emitting element is made of inorganic materials rather than organic materials, it has a faster lighting speed, higher emission efficiency, and higher luminance compared to liquid crystal displays and organic light-emitting displays.

BRIEF SUMMARY

A micro light emitting diode (Micro LED) light-emitting element exhibits a large variation in optical performance according to a temperature change.

An embodiment of the present specification provides a method for compensating temperature and a display apparatus that may maintain the reliability of the display apparatus even in an environment where the temperature changes.

Features of embodiments of the present specification are not limited to the above-described features, and other features that are not described herein will be apparently understood by those skilled in the art from the following description.

A method for compensating temperature according to an embodiment of the present specification may include: setting an on-pulse width of an emission signal according to luminance of pixels based on optical compensation; generating first and second linear function graphs by measuring the luminance according to the on-pulse width of the emission signal set at first and second temperatures; generating a target linear function graph relating the on-pulse width of the emission signal set at a target temperature and the luminance, based on the first and second linear function graphs; and adjusting the on-pulse width of the emission signal set based on the target linear function graph.

A display apparatus according to an embodiment of the present specification includes a display panel including pixels, a memory configured to store data, and a processor configured to control the memory and perform calculations using the data. The processor may set an on-pulse width of an emission signal according to luminance of the pixels based on optical compensation, generate first and second linear function graphs by measuring the luminance according to the on-pulse width of the emission signal set at first and second temperatures, generate a target linear function graph relating the on-pulse width of the emission signal set at a target temperature and the luminance based on the first and second linear function graphs, and adjust the on-pulse width of the emission signal set based on the target linear function graph.

Specific details according to various examples of the present specification other than the means for solving the above-mentioned problems are included in the description and drawings below.

According to one or more embodiments of the present specification, coefficient values related to temperature may be calculated by measuring luminance variations according to pulse width at room temperature and high temperature, and temperature compensation may be performed at a target temperature based on the coefficient values. Accordingly, the reliability of the display apparatus may be maintained even in an environment where the temperature changes.

The effects of the present specification are not limited to the effects mentioned above, and other effects not mentioned can be clearly understood by those skilled in the art to which the technical idea of the present specification pertains from the following description.

BRIEF DESCRIPTION OF THE SEVERAL VIEWS OF THE DRAWINGS

The above and other objects, features, and advantages of the present specification will become more apparent to those of ordinary skill in the art by describing exemplary embodiments thereof in detail with reference to the attached drawings, in which.

DETAILED DESCRIPTION

Figure 1:
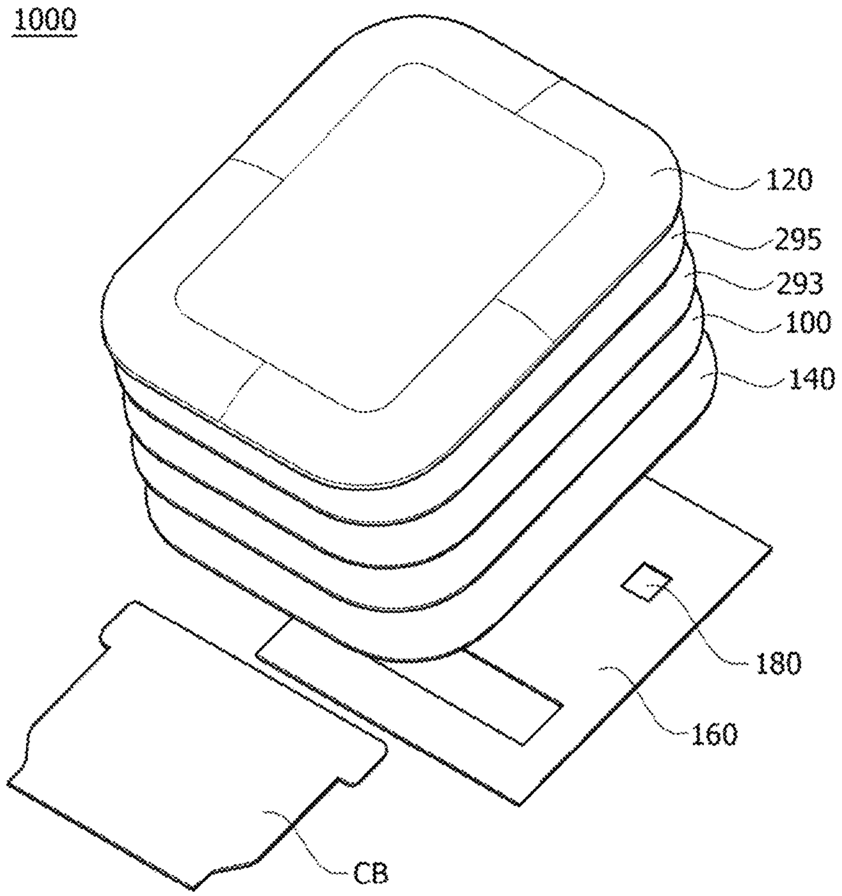
FIG. 1 is a perspective view illustrating a display device according to an embodiment of the present specification.

Advantages and features of the present specification and a method of achieving the same should become clear with embodiments described in detail below with reference to the accompanying drawings. However, the present specification is not limited to the embodiments described below and may be implemented with a variety of different modifications. The embodiments are merely provided to allow those skilled in the art to completely understand the scope of the present specification.

The shapes, dimensions, ratios, angles, numbers, and the like disclosed in the drawings for describing the embodiments of the present specification are merely illustrative and are not limited to matters shown in the present specification. Like reference numerals refer to like elements throughout the specification. Further, in describing the present specification, detailed descriptions of well-known technologies will be omitted when it is determined that they may unnecessarily obscure the gist of the present specification. Terms such as "including," "having," and "composed of" used herein are intended to allow other elements to be added unless the terms are used with the term "only." Any references to the singular may include the plural unless expressly stated otherwise.

Components are interpreted as including an ordinary error range even if no such margin is explicitly stated.

In the case of a description of a positional relationship, for example, in the case in which a position relationship between two portions is described with the terms "on," "above," "under," "next to," or the like, one or more portions may be interposed therebetween unless the term, for example, "right", "directly", or "near" is used in the expression.

For the description of a temporal relationship, when a temporal relationship is described as "after," "subsequently to," "next," "before," and the like, a non-consecutive case may be included unless the term "immediately" or "directly" is used in the expression.

Although the terms "first," "second," and the like may be used herein to describe various components, the components are not limited by the terms. These terms are used only to distinguish one component from another. Therefore, a first component described below may be a second component within the technological scope of the present specification.

Terms such as first, second, A, B, (a), (b), or the like may be used herein when describing components of the present specification. Such terms are used only to distinguish a component from another component, but do not limit the nature, sequence, order, number, or the like of components.

It is to be understood that when a component is described as being "connected," "coupled," "linked," or "attached" to another component, the component may be directly connected, coupled, linked, or attached to the other component, but, unless specifically stated otherwise, still another component may be interposed between these two components so that they are indirectly connected, coupled, linked, or attached.

It is also to be understood that when a component or layer is described as being "in contact with" or "overlapping" another component or layer, the component or layer may be in direct contact with or directly overlapping the other component or layer, but, unless specifically stated otherwise, still another component or layer may be interposed between these two components or layers so that they are in indirect contact with or indirectly overlapping each other.

The term "at least one" should be understood as including any and all combinations of one or more of the associated listed components. For example, the meaning of "at least one of a first component, a second component, and a third component" denotes the combination of all components proposed from two or more of the first component, the second component, and the third component as well as the first component, the second component, or the third component.

The terms "first direction," "second direction," "third direction," "X-axis direction," "Y-axis direction," and "Z-axis direction" should not be interpreted as referring only to geometrical relationships that are perpendicular to each other, but may indicate a broader range of directions within the functional scope of the configuration described in the present specification.

The features of various embodiments of the present specification may be partially or entirely combined with each other. The embodiments may be technically linked and operate in various ways and may be carried out independently of or in association with each other.

Hereinafter, various embodiments of the present specification will be described in detail with reference to the accompanying drawings.

Figure 2:
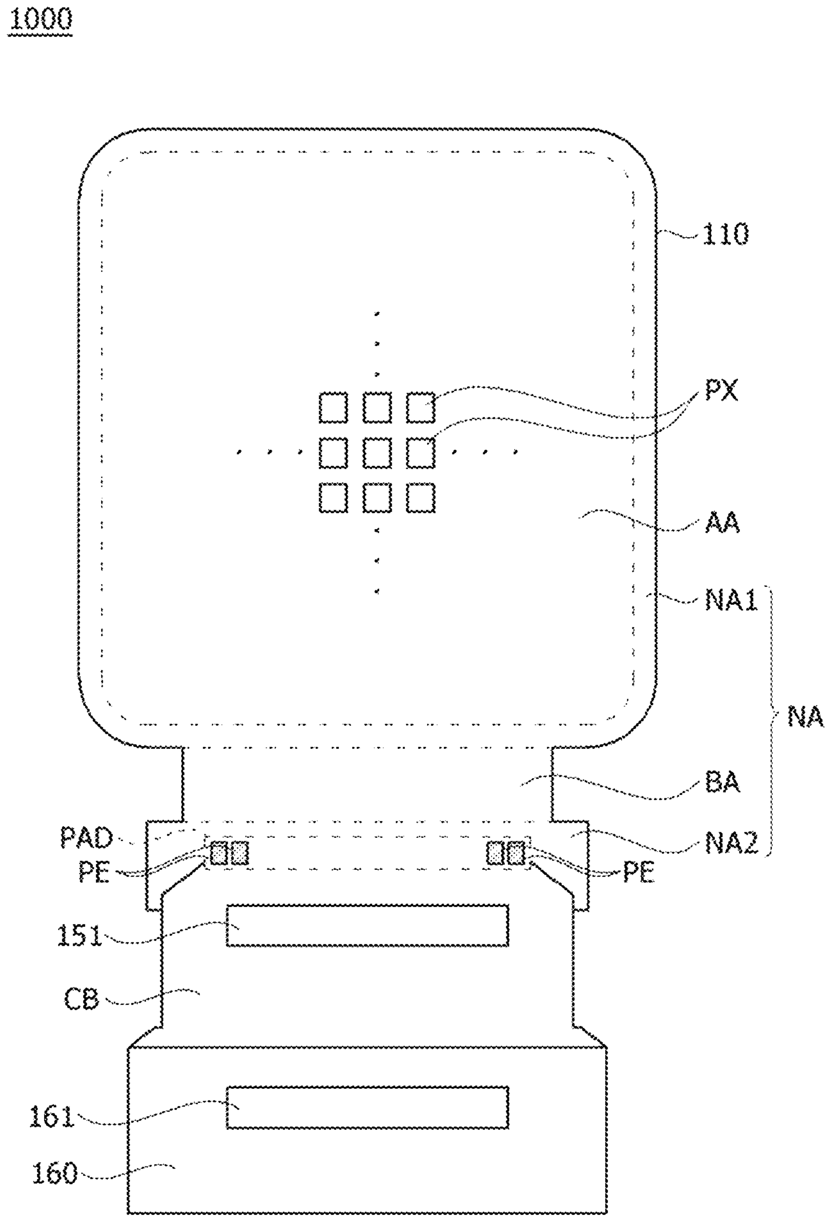
FIG. 2 is a plan view illustrating the display device according to an embodiment of the present specification.
Figure 3:
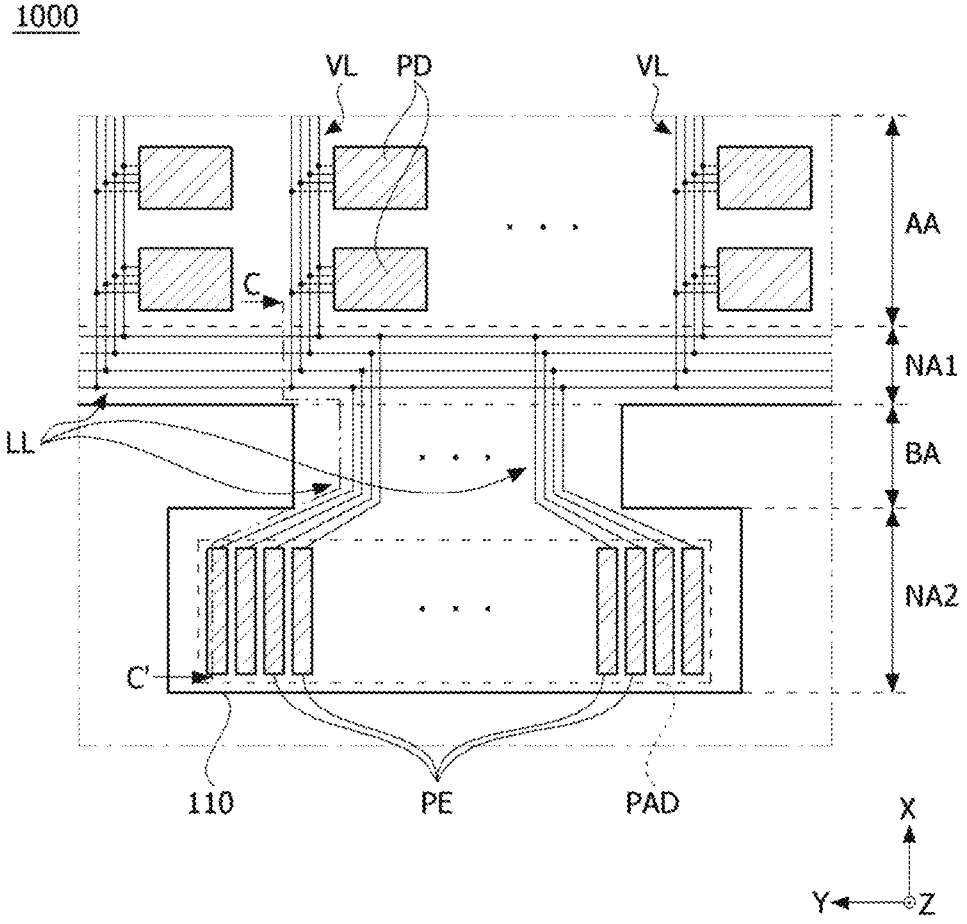
FIG. 3 is an enlarged view illustrating the display device according to an embodiment of the present specification

FIG. 1 is a perspective view illustrating a display device according to an embodiment of the present specification; FIG. 2 is a plan view illustrating the display device according to an embodiment of the present specification; FIG. 3 is an enlarged view illustrating the display device according to an embodiment of the present specification;

Referring to FIGS. 1 to 3, a display device 1000 according to an embodiment of the present specification may include a display panel 100, a polarizing layer 293, an adhesive layer 295, a cover member 120, a support substrate 140, a flexible circuit board CB, and a printed circuit board 160.

For example, the display device 1000 may include a substrate 110. The substrate 110 may be a member that supports other components of the display device 1000. The substrate 110 may be made of an insulating material. For example, the substrate 110 may be made of glass, resin or the like. The substrate 110 may also be made of a material having flexibility. For example, the substrate 110 may be made of a plastic material having flexibility, such as polyimide (PI). However, embodiments of the present specification are not limited thereto.

The display panel 100 may implement information, video, and/or images intended for the user. For example, the display panel 100 may include a display area AA and a non-display area NA. For example, the substrate 110 may include the display area AA and the non-display area NA. The term of the display area AA and the non-display area NA may not be limited to the substrate 110, but may be applied throughout the display device.

The display area AA may be an area where an image is displayed. The display area AA may include a plurality of pixels PX. Each of a plurality of pixels PX may be composed of a plurality of sub-pixels. A plurality of light-emitting elements may be arranged in each of the plurality of sub-pixels. The plurality of light-emitting elements may be configured differently depending on the type of display device 1000. For example, if the display device 1000 is an inorganic light-emitting display device, the light-emitting elements may be light-emitting diodes (LED), micro light-emitting diodes (micro LED), or mini light-emitting diodes (mini LED), but embodiments of the present specification are not limited thereto.

The non-display area NA may be an area where no image is displayed. Various wires and circuits for driving a plurality of light-emitting elements in the plurality of pixels PX of the display area AA may be arranged in the non-display area NA. For example, in the non-display area NA, various wires and driving circuits may be mounted and a pad part PAD may be arranged to which integrated circuits, printed circuits, etc., are connected, but embodiments of the present specification are not limited thereto.

For example, the driving circuits may be a data driving circuit and/or a gate driving circuit, but embodiments of the present specification are not limited thereto. Wires to which control signals for controlling the driving circuits are supplied may be arranged. For example, the control signals may include various timing signals including clock signals, input data enable signals, and synchronization signals, but embodiments of the present specification are not limited thereto. The control signals may be received through the pad part PAD. For example, link wires LL for transmitting signals may be arranged in the non-display area NA. For example, driving components such as a flexible circuit board CB and a printed circuit board 160 may be connected to the pad part PAD.

According to the present specification, the non-display area NA may include a first non-display area NA1, a bending area BA, and a second non-display area NA2. For example, the first non-display area NA1 may be an area surrounding at least a portion of the display area AA. The bending area BA may be an area extending from at least one of a plurality of sides of the first non-display area NA1, and may be a bendable area. The second non-display area NA2 is an area extending from the bending area BA, in which the pad part PAD may be arranged. For example, the bending area BA may be in a bent state, and the remaining area of the substrate 110 other than the bending area BA may be in a flat state. In this configuration, as the bending area BA is bent, the second non-display area NA2 may be located on the rear surface of the display area AA. However, embodiments of the present specification are not limited thereto.

The display area AA of the substrate 110 or the display device 1000 may be configured in a variety of shapes depending on the design of the display device 1000. For example, the display area AA may be configured as a rectangular shape with four rounded corners, but embodiments of the present disclosure are not limited thereto. For another example, the display area AA may be configured as a rectangular shape with four right-angled corners, a circular shape, or the like, but embodiments of the present specification are not limited thereto.

According to the present specification, the width of the second non-display area NA2 in which the plurality of pad electrodes PE are arranged, may be wider than the width of the bending area BA in which only the plurality of link wires LL are arranged. Furthermore, the width of the display area AA in which the plurality of sub-pixels are arranged may be wider than the width of the bending area BA in which only the plurality of link wires LL is arranged. While the width of the bending area BA is shown to be narrower than the width of other areas of the substrate 110 in this drawing, the shape of the substrate 110 including the bending area BA is communication wires, and embodiments of the present specification are not limited thereto.

Referring to FIG. 3, a plurality of pixel driving circuits PD may be arranged in the display area AA. The plurality of pixel driving circuits PD may be circuits for driving the light-emitting elements of a plurality of sub-pixels. Each of the plurality of pixel driving circuits PD includes a plurality of transistors, including a driving transistor, and a storage capacitor or the like, and may supply control signals, power, and driving currents to the light-emitting elements of the plurality of sub-pixels to control the emission operation of the plurality of light-emitting elements. For example, the pixel driving circuits PD may include power wires and signal wires for controlling the emission on/off and/or emission time of the light-emitting elements. For example, the plurality of pixel driving circuits PD may be drive drivers manufactured on a semiconductor substrate using a metal-oxide-silicon field effect transistor (MOSFET) manufacturing process, but embodiments of the present specification are not limited thereto. The drive driver may include the plurality of pixel driving circuits PD and may drive the plurality of sub-pixels.

Referring to FIG. 1 together, the flexible circuit board CB and the printed circuit board 160 may be arranged on a lower portion of the display panel 100.

The flexible circuit board CB and the printed circuit board 160 may be arranged on at least one side edge of the display panel 100, but embodiments of the present specification are not limited thereto. One side of the flexible circuit board CB may be attached to the display panel 100, and the other side may be attached to the printed circuit board 160, but embodiments of the present specification are not limited thereto. The flexible circuit board CB may be a flexible film, but embodiments of the present specification are not limited thereto.

The pad part PAD including a plurality of pad electrodes PE may be arranged in the second non-display area NA2. Driving components including one or more flexible circuit boards (or flexible films) CB and printed circuit boards 160 may be attached to or bonded to the pad part PAD. The plurality of pad electrodes PE of the pad part PAD are electrically connected to one or more flexible circuit boards (or flexible film) CB, and various signals (or power) from the printed circuit boards 160 and the flexible circuit boards (or flexible films) CB may be transmitted to the plurality of pixel driving circuits PD of the display area AA.

A flexible circuit board (or flexible film) CB may be a film with various components placed on a flexible base film. For example, a drive IC, such as a gate driver IC or a data driver IC, may be located on the flexible circuit board (or flexible film) CB, but embodiments of the present specification are not limited thereto. The drive IC may be a component that processes data and driving signals for displaying the image.

The drive IC may be arranged in a manner such as a chip on glass (COG), a chip on film (COF), or a tape carrier package (TCP), depending on how it is mounted, but embodiments of the present specification are not limited thereto. The flexible circuit board (or flexible film) CB may be attached or bonded to the plurality of pad electrodes PE through a conductive adhesive layer, but embodiments of the present specification are not limited thereto. For example, the flexible circuit board CB may include a control circuit that is a timing controller 151, TCON.

The printed circuit board 160 may be electrically connected to one or more flexible circuit boards (or flexible films) CB and may be a component that supplies signals to the drive ICs. The printed circuit board 160 may be arranged on one side of the flexible circuit board (or flexible film) CB and electrically connected to the flexible circuit board (or flexible film) CB.

A variety of components for supplying different signals to the drive IC may be arranged on the printed circuit board 160. For example, various components such as a timing controller, a power supply, a memory, or a processor may be arranged on the printed circuit board 160. For example, the printed circuit board 160 may include a power management integrated circuit (PMIC) 161, but embodiments of the present specification are not limited thereto.

The printed circuit board 160 may include at least one hole 180, but embodiments of the present specification are not limited thereto. An internal component for sensing ambient light or temperature that may be provided to a plurality of sensors may be arranged in an area corresponding to the at least one hole 180. For example, the internal component may include an ambient light sensor (ALS) or a temperature sensor, but embodiments of the present specification are not limited thereto. For example, the hole 180 may be a transmissive hole or the like, but embodiments of the present specification are not limited thereto.

Referring to FIG. 1, the polarizing layer 293 may be located on the display panel 100. The polarizing layer 293 may prevent or reduce light generated by an external light source from entering the inside of the display panel 100 and affecting the light-emitting elements or the like.

The cover member 120 may be arranged on the polarizing layer 293. The cover member 120 may be a member for protecting the display panel 100. The adhesive layer 295 may be arranged between the polarizing layer 293 and the cover member 120. The cover member 120 may be attached to the display panel 100 by the adhesive layer 295. The adhesive layer 295 may include, but is not limited to, an optically clear adhesive (OCA), an optically cleared resin (OCR), or a pressure sensitive adhesive (PSA).

The support substrate 140 may be arranged between the display panel 100 and the printed circuit board 160. The support substrate 140 may reinforce the rigidity of the display panel 100. The support substrate 140 may be a back plate, but embodiments of the present specification are not limited thereto.

Referring to FIGS. 1 to 3, a plurality of link wires LL may be arranged in the non-display area NA. The plurality of link wires LL may be wires that carries various signals from one or more flexible circuit boards (or flexible films) CB and printed circuit boards 160 to the display area AA. The plurality of link wires LL may extend from the plurality of pad electrodes PE in the second non-display area NA2 toward the bending area BA and the first non-display area NA1, and may be electrically connected to a plurality of driving wires VL in the display area AA. The plurality of pixel driving circuits PD may be driven by signals received from one or more flexible circuit boards (or flexible films) CB and printed circuit boards 160 through the driving wires VL in the display area AA and the link wires LL in the non-display area NA.

For example, the plurality of driving wires VL may be wires for carrying signals output from the flexible circuit board (or flexible film) CB and the printed circuit board 160, along with a plurality of link wires LL, to the plurality of pixel driving circuits PD. The plurality of driving wires VL may be arranged in the display area AA and electrically connected to each of the plurality of pixel driving circuits PD. The plurality of driving wires VL may extend from the display area AA toward the non-display area NA and may be electrically connected to the plurality of link wires LL. Therefore, the signals output from the flexible circuit board (or flexible film) CB and the printed circuit board 160 may be transmitted to each of the plurality of pixel driving circuits PD through the plurality of link wires LL and the plurality of driving wires VL.

When the bending area BA is bent, portions of the plurality of link wires LL may be bent accordingly. Stress is concentrated in portions of the bent link wires LL, which may cause the link wires LL to crack. Accordingly, the plurality of link wires LL may be formed of a conductive material having excellent ductility to reduce cracking during bending of the bending area BA. For example, the plurality of link wires LL may be formed of a conductive material having excellent ductility such as gold (Au), silver (Ag), aluminum (Al), and the like, but embodiments of the present specification are not limited thereto. The plurality of link wires LL may also be formed of one of a variety of conductive materials used in the display area AA. For example, the plurality of link wires LL may be formed of molybdenum (Mo), chromium (Cr), titanium (Ti), nickel (Ni), neodymium (Nd), copper (Cu), and alloys of silver (Ag) and magnesium (Mg), or alloys thereof, but embodiments of the present specification are not limited thereto. The plurality of link wires LL may be formed of a multi-layer structure including various conductive materials. For example, the plurality of link wires LL may be formed of a triple-layer structure of titanium (Ti)/aluminum (Al)/titanium (Ti), but embodiments of the present specification are not limited thereto.

The plurality of link wires LL may be configured in various shapes to reduce stress. At least a portion of the plurality of link wires LL arranged in the bending area BA may extend in the same direction as the extension of the bending area BA, or may extend in a direction different from the extension of the bending area BA to reduce stress. For example, if the bending area BA extends in one direction from the first non-display area NA1 toward the second non-display area NA2, at least a portion of the link wires LL arranged on the bending area BA may extend in a direction that is inclined relative to the one direction. For another example, at least a portion of the plurality of link wires LL may be configured in a pattern of various shapes. For example, at least a portion of the plurality of link wires LL arranged in the bending area BA may be a shape in which a conductive pattern having at least one of a diamond shape, a rhombus shape, a trapezoidal shape, a triangular wave shape, a sawtooth wave shape, a sinusoidal shape, a circular shape, and an omega (Ω) shape is repeatedly arranged, but embodiments of the present specification are not limited thereto. Therefore, to minimize stresses concentrated in the plurality of link wires LL and resulting cracking, the shape of the plurality of link wires LL may be of various shapes including the shapes described above, but embodiments of the present specification are not limited thereto.

Figure 4:
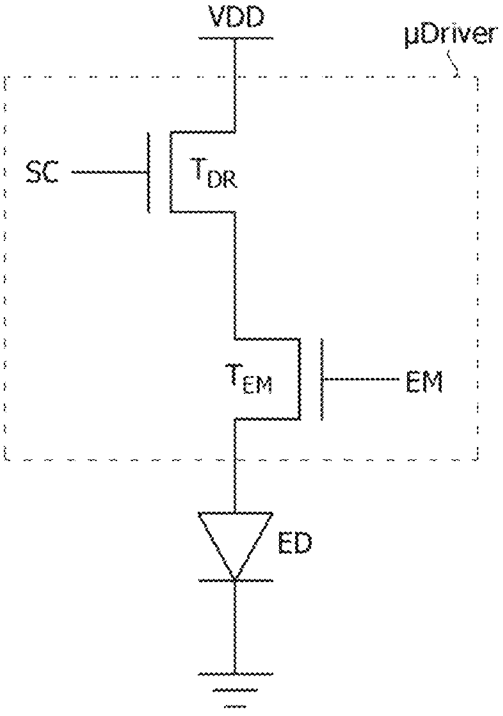
FIG. 4 is a diagram illustrating a circuit structure according to an embodiment of the present specification.

FIG. 4 is a diagram illustrating a circuit structure according to an embodiment of the present specification.

Although FIG. 4 illustrates one light-emitting element ED connected to a micro-driver μDriver, it is not limited thereto. For example, eight light-emitting elements ED may be connected to one micro-driver μDriver. For another example, 16 light-emitting elements ED may be connected to one micro-driver, or 32 light-emitting elements ED or 64 light-emitting element ED may be connected to one micro-driver simultaneously. The light-emitting element ED may be a micro light-emitting element μLED.

One micro-driver μDriver may include a driving transistor $T_{DR}$ and a light-emitting transistor $T_{EM}$, but embodiments of the present specification are not limited thereto.

For example, the driving transistor $T_{DR}$ may have a first electrode to which a high potential power voltage VDD is applied, a second electrode connected to a first electrode of the light-emitting transistor $T_{EM}$, and a gate electrode to which a scan signal SC is applied. The scan signal SC applied to the gate electrode of the driving transistor $T_{DR}$ may be a direct current voltage that is applied as a fixed reference voltage (Vref) for each frame, but embodiments of the present specification are not limited thereto.

The light-emitting transistor $T_{EM}$ may have a first electrode connected to the second electrode of the driving transistor $T_{DR}$, a second electrode connected to the light-emitting element ED, and a gate electrode to which the emission signal EM is applied. The emission signal EM applied to the gate electrode of the light-emitting transistor $T_{EM}$ may be a pulse width modulation signal that varies every frame, but embodiments of the present specification are not limited thereto.

The light-emitting element ED may have a first electrode connected to a second electrode of the light-emitting transistor $T_{EM}$ and a second electrode to ground. For example, the first electrode may be an anode electrode and the second electrode may be a cathode electrode, but embodiments of the present specification are not limited thereto.

Each of the driving transistor $T_{DR}$ and the light-emitting transistor $T_{EM}$ may be n-type transistors or p-type transistors.

In the micro-driver Driver, the driving transistor $T_{DR}$ may be turned on by the scan signal SC applied from the timing controller T-CON, and the light-emitting transistor TEM may be turned on by the emission signal EM. Accordingly, a driving current is applied to the light-emitting element ED through the driving transistor $T_{DR}$ and the light-emitting transistor $T_{EM}$ by the high-potential power voltage VDD applied to the first electrode of the driving transistor $T_{DR}$, thereby causing the light-emitting element ED to emit light.

Figure 5:
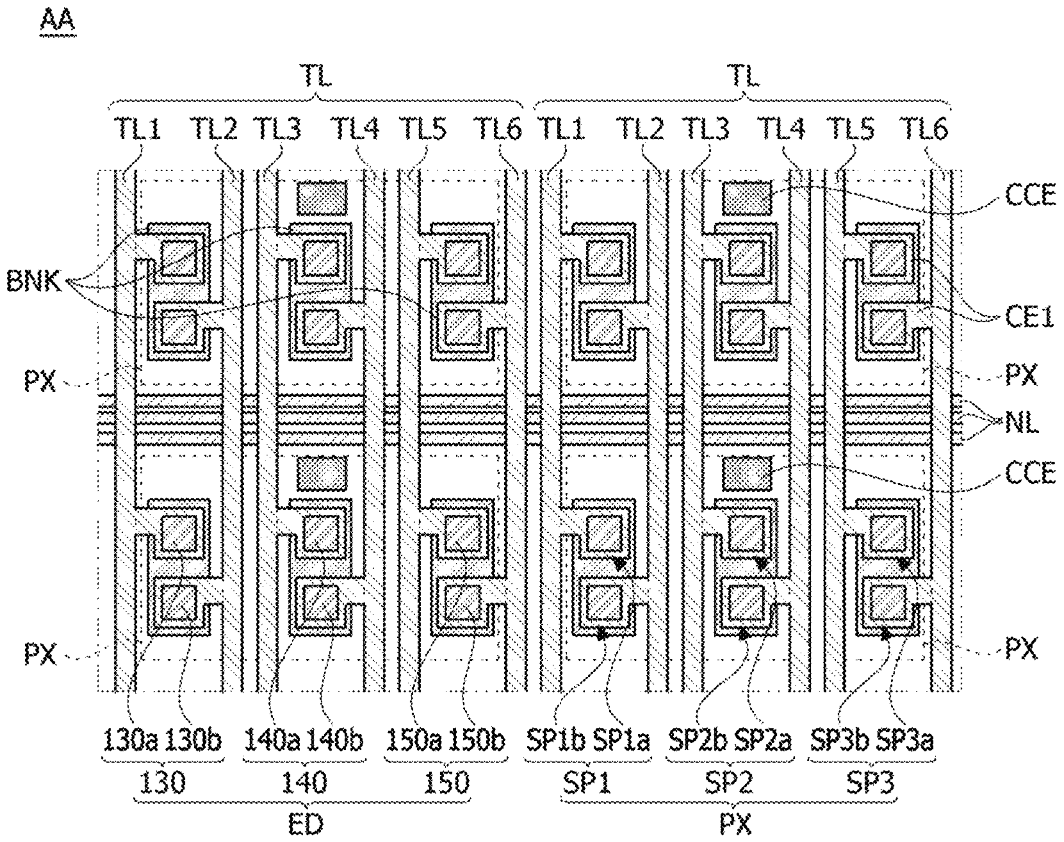
FIG. 5 is plan views of the display device according to an embodiment of the present specification.
Figure 6:
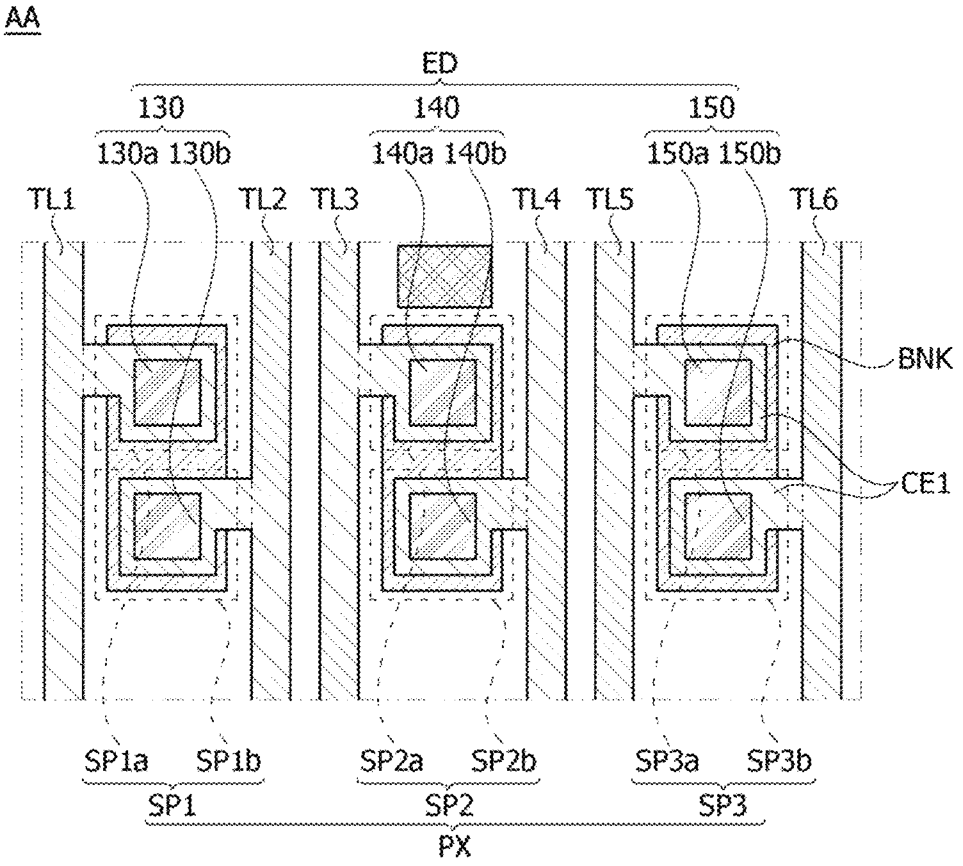
FIG. 6 is plan views of the display device according to an embodiment of the present specification.
Figure 7:
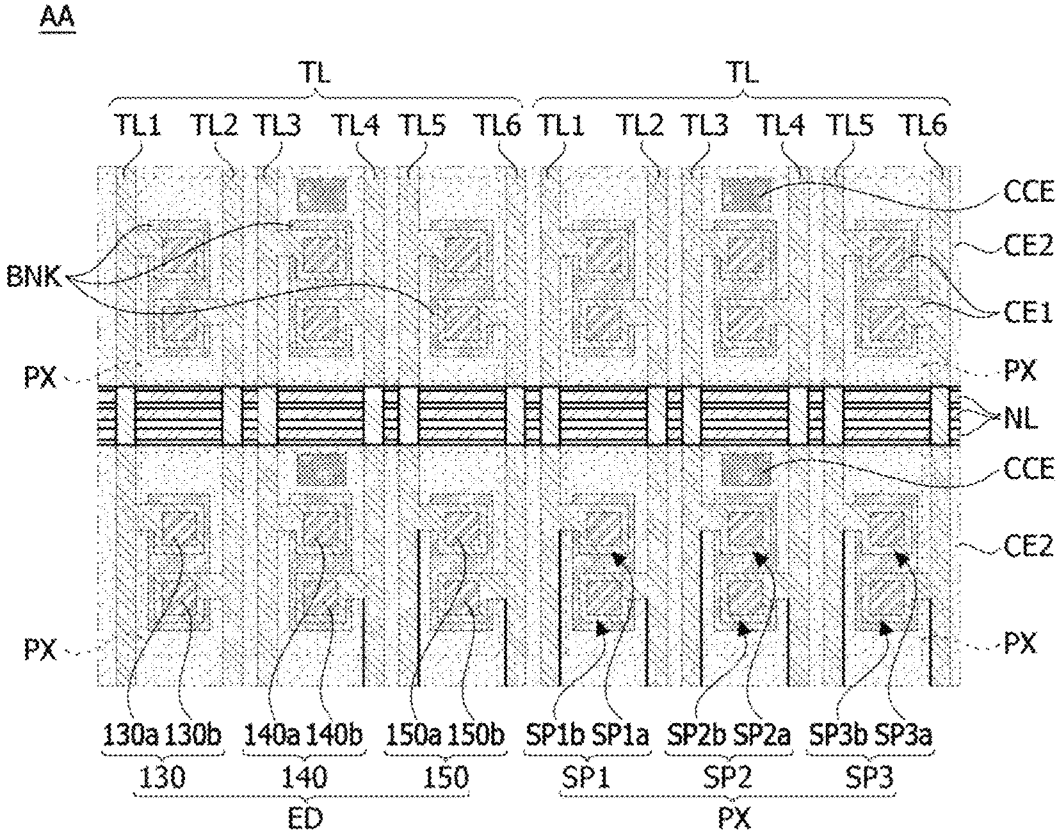
FIG. 7 is plan views of the display device according to an embodiment of the present specification.

FIGS. 5 to 7 are plan views of the display device according to an embodiment of the present specification. For example, FIG. 5 is an enlarged plan view of a display area including a plurality of pixels. For example, FIG. 6 is an enlarged plan view of a display area including one pixel. For example, FIG. 7 is an enlarged plan view of a display area including a plurality of pixels. While FIGS. 5 and 6 illustrate only a plurality of signal wires TL, a plurality of communication wires NL, a plurality of first electrodes CE1, a plurality of banks BNK, and a plurality of light-emitting elements ED, embodiments of the present specification are not limited thereto. FIG. 7 is an enlarged plan view in which a plurality of second electrodes CE2 are additionally arranged in FIG. 5.

Referring to FIGS. 5 to 6, a plurality of pixels PX composed of a plurality of sub-pixels may be arranged in the display area AA. Each of the plurality of sub-pixels may include a light-emitting element ED, which may independently emit light. The plurality of sub-pixels may be arranged in a matrix, forming a plurality of rows and a plurality of columns, but embodiments of the present specification are not limited thereto.

The plurality of sub-pixels may include a first sub-pixel SP1, a second sub-pixel SP2, and a third sub-pixel SP3. For example, one of the first sub-pixel SP1, the second sub-pixel SP2, and the third sub-pixel SP3 may be a red sub-pixel, another may be a green sub-pixel, and the remaining may be a blue sub-pixel. The types of the plurality of sub-pixels are illustrative, and embodiments of the present specification are not limited thereto.

Each of the plurality of pixels PX may include one or more first sub-pixels SP1, one or more second sub-pixels SP2, and one or more third sub-pixels SP3. For example, one pixel PX may include a pair of first sub-pixels SP1, a pair of second sub-pixels SP2, and a pair of third sub-pixels SP3. The pair of first sub-pixels SP1 may be composed of a first-first sub-pixel SP1*a* and a first-second sub-pixel SP1*b*. The pair of second sub-pixels SP2 may be composed of a second-first sub-pixel SP2*a* and a second-second sub-pixel SP2*b*. The pair of third sub-pixels SP3 may be composed of a third-first sub-pixel SP3*a* and a third-second sub-pixel SP3*b*. For example, one pixel PX may include a first-first sub-pixel SP1*a* and a first-second sub-pixel SP1*b*, a second-first sub-pixel SP2*a* and a second-second sub-pixel SP2*b*, and a third-first sub-pixel SP3*a* and a third-second sub-pixel SP3*b*, but embodiments of the present specification are not limited thereto.

The plurality of sub-pixels that constitute one pixel PX may be arranged in a variety of ways. For example, in one pixel PX, a pair of first sub-pixels SP1 may be arranged in the same column, a pair of second sub-pixels SP2 may be arranged in the same column, and a pair of third sub-pixels SP3 may be arranged in the same column. The first sub-pixel SP1, the second sub-pixel SP2, and the third sub-pixel SP3 may be arranged in the same row. The number and arrangement of the plurality of sub-pixels constituting one pixel PX are exemplary, and embodiments of the present specification are not limited thereto.

A plurality of signal wires TL may be arranged in the area between the plurality of sub-pixels. The plurality of signal wires TL may extend in the column direction between the plurality of sub-pixels. The plurality of signal wires TL may be wires that carry anode voltages from the pixel driving circuit PD to the plurality of sub-pixels. For example, the plurality of signal wires TL may be electrically connected to the plurality of pixel driving circuits PD and the first electrodes CE1 of the plurality of sub-pixels. The anode voltages output from the pixel driving circuits PD may be transmitted to the first electrodes CE1 of the plurality of sub-pixels through the plurality of signal wires TL. For example, a first electrode CE1 may be an electrode electrically connected to the anode electrode 134 of the light-emitting element ED. Therefore, the anode voltage from the signal wire TL may be transmitted to the anode electrode 134 of the light-emitting element ED through the first electrode CE1.

Consequently, instead of forming a plurality of transistors and storage capacitors for each of the plurality of sub-pixels, the structure of the display device 1000 may be simplified by using the pixel driving circuits PD with an integrated plurality of pixel circuits. In addition, by integrating the circuits arranged for each of the plurality of sub-pixels into a single pixel driving circuit PD, high-efficiency, low-power operation may be achieved.

The plurality of signal wires TL may include a first signal wire TL1, a second signal wire TL2, a third signal wire TL3, a fourth signal wire TL4, a fifth signal wire TL5, and a sixth signal wire TL6. Each of the first signal wire TL1 and the second signal wire TL2 may be electrically connected to each of the pair of first sub-pixels SP1. Each of the third signal wire TL3 and the fourth signal wire TL4 may be electrically connected to each of the pair of second sub-pixels SP2. Each of the fifth signal wire TL5 and the sixth signal wire TL6 may be electrically connected to each of the pair of third sub-pixels SP3.

The first signal wire TL1 may be arranged on one side of the pair of first sub-pixels SP1, and the second signal wire TL2 may be arranged on the other side of the pair of first sub-pixels SP1. The first signal wire TL1 may be electrically connected to the first electrode CE1 of one of the pair of first sub-pixels SP1, for example, the first-first sub-pixel SP1*a*. The second signal wire TL2 may be electrically connected to the first electrode CE1 of the remaining of the pair of first sub-pixels SP1, for example, the first-second sub-pixel SP1*b*.

The third signal wire TL3 may be arranged on one side of the pair of second sub-pixels SP2, and the four signal wire TL4 may be arranged on the other side of the pair of second sub-pixels SP2. For example, the third signal wire TL3 may be arranged adjacent to the second signal wire TL2. The third signal wire TL3 may be electrically connected to the first electrode CE1 of one of the pair of second sub-pixels SP2, for example, the second-first sub-pixel SP2*a*. The fourth signal wire TL4 may be electrically connected to the first electrode CE1 of the remaining of the pair of second sub-pixels SP2, for example, the second-second sub-pixel SP2*b*.

The fifth signal wire TL5 may be arranged on one side of the pair of third sub-pixels SP3, and the sixth signal wire TL6 may be arranged on the other side of the pair of third sub-pixels SP3. For example, the fifth signal wire TL5 may be arranged adjacent to the fourth signal wire TL4. The sixth signal wire TL6 may be arranged adjacent to the first signal wire TL1 connected to its neighboring pixel PX. The fifth signal wire TL5 may be electrically connected to the first electrode CE1 of one of the pair of third sub-pixels SP3, for example, the third-first sub-pixel SP3*a*. The sixth signal wire TL6 may be electrically connected to the first electrode CE1 of the remaining of the pair of third sub-pixels SP3, for example, the third-second sub-pixel SP3*b*.

The plurality of signal wires TL may be made of a conductive material. For example, the plurality of signal wires TL may be formed of conductive materials such as titanium (Ti), aluminum (Al), copper (Cu), molybdenum (Mo), nickel (Ni), chromium (Cr), indium tin oxide (ITO), indium zinc oxide (IZO), indium gallium zinc oxide (IGZO), and the like, but embodiments of the present specification are not limited thereto. For another example, the plurality of signal wires TL may be formed of a multi-layer structure of a conductive material. For example, the plurality of signal wires TL may be formed of a multi-layer structure of Titanium (Ti)/Aluminum (Al)/Titanium (Ti)/Indium Tin Oxide (ITO), but embodiments of the present specification are not limited thereto.

The plurality of communication wires NL may be arranged in the area between the plurality of pixels PX. The plurality of communication wires NL may be arranged extending in the row direction in an area between the plurality of pixels PX. The plurality of communication wires NL may be arranged in an area between the plurality of second electrodes CE2, and may not overlap the plurality of second electrodes CE2. For example, the plurality of communication wires NL may be wires used for short-range communication, such as near field communication (NFC). The plurality of communication wires NL may function as antennas. For example, the plurality of communication wires NL may be a plurality of connection wires or the like, but embodiments of the present specification are not limited thereto.

According to the present specification, a bank BNK may be positioned in each of the plurality of sub-pixels. A plurality of banks BNK may be structures in which a plurality of light-emitting elements ED are seated. The plurality of banks BNK may serve to guide the positioning of the plurality of light-emitting elements ED during a transfer process of transferring the plurality of light-emitting elements ED to the display device 1000. In the process of transferring a plurality of light-emitting elements ED, the plurality of light-emitting elements ED may be transferred onto the plurality of banks BNK. The plurality of banks BNK may be bank patterns or structures, or the like, but embodiments of the present specification are not limited thereto.

A bank BNK of the first sub-pixel SP1, a bank BNK of the second sub-pixel SP2, and a bank BNK of the third sub-pixel SP3 may be arranged to be spaced apart from each other. The bank BNK of the first sub-pixel SP1, the bank BNK of the second sub-pixel SP2, and the bank BNK of the third sub-pixel SP3 may be configured to be separated. Thus, the banks BNK of the first sub-pixels SP1, the second sub-pixels SP2, and the third sub-pixels SP3, to which different types of light-emitting elements ED are transferred, may be easily identified.

The bank BNK of the first-first sub-pixel SP1*a* and the bank BNK of the first-second sub-pixel SP1*b* may be connected to each other, or may be spaced apart from each other or formed separately from each other. For example, the bank BNK of the first-first sub-pixel SP1*a* and the bank BNK of the first-second sub-pixel SP1*b*, in which the same type of light-emitting elements ED are arranged, may be connected to each other, spaced apart, or separated from each other in consideration of the design such as the transfer process requirements, etc. The bank BNK of the second-first sub-pixel SP2*a* and the bank BNK of the second-second sub-pixel SP2*b* may also be connected to each other, or may also be spaced apart or separated from each other. The bank BNK of the third-first sub-pixel SP3*a* and the bank BNK of the third-second sub-pixel SP3*b* may also be connected to each other, or may be spaced apart from each other or formed separately from each other. Therefore, the banks BNK of the pair of first sub-pixels SP1, the banks BNK of the pair of second sub-pixels SP2, and the bank BNKs of the pair of third sub-pixels SP3 may be formed in various ways, and embodiments of the present specification are not limited thereto.

For example, the plurality of banks BNK may be made of an organic insulating material. The plurality of banks BNK may be formed of a single or multiple layers of an organic insulating material. For example, the plurality of banks BNK may be formed of a photo resist, polyimide (PI), or acryl-based material, but embodiments of the present specification are not limited thereto.

The first electrode CE1 may be positioned on each of the plurality of sub-pixels. The first electrode CE1 may be positioned on the bank BNK. The first electrode CE1 may be electrically connected to one of the plurality of signal wires TL. At least a portion of the first electrode CE1 may extend outwardly of the bank BNK and may be electrically connected to the signal wire TL closest to the first electrode CE1. For example, a portion of the first electrode CE1 of the first-first sub-pixel SP1*a* may extend to one side area of the first-first sub-pixel SP1*a* and be electrically connected to the first signal wire TL1, and a portion of the first electrode CE1 of the first-second sub-pixel SP1*b* may extend to the other side area of the first-second sub-pixel SP1*b* and be electrically connected to the second signal wire TL2. A portion of the first electrode CE1 of the second-first sub-pixel SP2*a* may extend to one side area of the second-first sub-pixel SP2*a* and be electrically connected to the third signal wire TL3, and a portion of the first electrode CE1 of the second-second sub-pixel SP2*b* may extend to the other side area of the second-second sub-pixel SP2*b* and be electrically connected to the fourth signal wire TL4. A portion of the first electrode CE1 of the third-first sub-pixel SP3*a* may extend to one side area of the third-first sub-pixel SP3*a* and be electrically connected to the fifth signal wire TL5, and a portion of the first electrode CE1 of the third-second sub-pixel SP3*b* may extend to the other side area of the third-second sub-pixel SP3*b* and be electrically connected to the sixth signal wire TL6.

The first electrode CE1 is electrically connected to the anode electrode 134 of the light-emitting element ED, and may transmit the anode voltage from the pixel driving circuit PD to the light-emitting element ED through the signal wire TL. Different voltages may be applied to the first electrode CE1 of each of the plurality of sub-pixels according to the image being displayed. For example, different voltages may be applied to the first electrode CE1 of each of the plurality of sub-pixels. The first electrode CE1 may be a pixel electrode, and embodiments of the present specification are not limited thereto.

The first electrode CE1 may be formed of a conductive material. For example, the first electrode CE1 may be integrally configured with the plurality of signal wires TL. For example, the first electrode CE1 may be formed of the same conductive material as the plurality of signal wires TL, but embodiments of the present specification are not limited thereto. For example, the first electrode CE1 may be formed of a conductive material such as titanium (Ti), aluminum (Al), copper (Cu), molybdenum (Mo), nickel (Ni), chromium (Cr), indium tin oxide (ITO), indium zinc oxide (IZO), indium gallium zinc oxide (IGZO), and the like, but embodiments of the present specification are not limited thereto. For another example, the first electrode CE1 may be formed of a multi-layer structure of a conductive material. For example, the plurality of first electrodes CE1 may be made of a multi-layer structure of Titanium (Ti)/Aluminum (Al)/Titanium (Ti)/Indium Tin Oxide (ITO), but embodiments of the present specification are not limited thereto.

The light-emitting element ED may be arranged in each of the plurality of sub-pixels. A plurality of light-emitting elements ED may be either light-emitting diodes (LED) or micro LED, but embodiments of the present specification are not limited thereto. The plurality of light-emitting elements ED may be arranged on the bank BNK and the first electrode CE1. The plurality of light-emitting elements ED are arranged on the first electrode CE1 and may be electrically connected to the first electrode CE1. Therefore, the light-emitting element ED may emit light by receiving an anode voltage from the pixel driving circuit PD through the signal wire TL and the first electrode CE1.

The plurality of light-emitting elements ED may include a first light-emitting element 130, a second light-emitting element 140, and a third light-emitting element 150. The first light-emitting element 130 may be arranged in the first sub-pixel SP1. The second light-emitting element 140 may be arranged in the second sub-pixel SP2. The third light-emitting element 150 may be arranged in the third sub-pixel SP3. For example, one of the first light-emitting element 130, the second light-emitting element 140, and the third light-emitting element 150 may be a red light-emitting element, another may be a green light-emitting element, and the remaining may be a blue light-emitting element, but embodiments of the present specification are not limited thereto. Accordingly, various colors of light, including white, may be implemented by combining red light, green light, and blue light emitted by the plurality of light-emitting elements ED. The types of the plurality of light-emitting elements ED are exemplary, and embodiments of the present specification are not limited thereto.

The first light-emitting element 130 may include the first-first light-emitting element 130*a* arranged in the first-first sub-pixel SP1*a* and the first-second light-emitting element 130*b* arranged in the first-second sub-pixel SP1*b*. The second light-emitting element 140 may include the second-first light-emitting element 140*a* arranged in the second-first sub-pixel SP2*a* and the second-second light-emitting element 140*b* arranged in the second-second sub-pixel SP2*b*. The third light-emitting element 150 may include a third-first light-emitting element 150*a* arranged in the third-first sub-pixel SP3*a* and the third-second light-emitting element 150*b* arranged in the third-second sub-pixel SP3*b*.

Referring to FIGS. 5 and 6, together with FIG. 7, the second electrode CE2 may be arranged on each of the plurality of sub-pixels. The second electrode CE2 may be positioned on the light-emitting element ED. The second electrode CE2 may be electrically connected to the pixel driving circuit PD through a plurality of contact electrodes CCE.

For example, the second electrode CE2 may be electrically connected to a cathode electrode 135 of the light-emitting element ED to transmit the cathode voltage from the pixel driving circuit PD to the light-emitting element ED. The same cathode voltage may be applied to the second electrode CE2 of each of the plurality of sub-pixels. For example, the same voltage may be applied to the second electrode CE2 of each of the plurality of sub-pixels and the cathode electrode 135 of the light-emitting element ED. Thus, the second electrode CE2 may be a common electrode, but embodiments of the present specification are not limited thereto.

At least some of the plurality of sub-pixels may share the second electrode CE2. At least some of the second electrodes CE2 of the plurality of sub-pixels may be electrically connected to each other. Since the same voltage is applied to the second electrodes CE2, at least some of the second electrodes CE2 of the sub-pixels may be shared and used. For example, the second electrodes CE2 of at least some of the plurality of pixels PX arranged in the same row may be connected to each other. For example, one second electrode CE2 may be arranged on a plurality of pixels PX. One second electrode CE2 may be arranged for each of n sub-pixels.

For example, some of the second electrodes CE2 of the plurality of sub-pixels may be spaced apart or separated from each other. For example, the second electrode CE2 connected to an (n)th row of pixels PX and the second electrode CE2 connected to an (n+1)th row of pixels PX may be spaced apart or separated from each other. For example, the plurality of second electrodes CE2 may be spaced apart from each other with a plurality of communication wires NL extending in the row direction interposed therebetween. Thus, the number of the plurality of sub-pixels may be greater than the number of the plurality of second electrodes CE2. For another example, the second electrodes CE2 of the plurality of sub-pixels may all be connected to each other so that only one second electrode CE2 is arranged on the substrate 110, and embodiments of the present specification are not limited thereto.

The plurality of second electrodes CE2 may be formed of a transparent conductive material, but embodiments of the present specification are not limited thereto. The plurality of second electrodes CE2 may be made of a transparent conductive material, such that light emitted from the light-emitting element ED is directed onto the upper portion of the second electrode CE2. For example, the second electrode CE2 may made of a transparent conductive material such as Indium Tin Oxide (ITO), Indium Zinc Oxide (IZO), Indium Gallium Zinc Oxide (IGZO), or the like, but embodiments of the present specification are not limited thereto.

A plurality of contact electrodes CCE may be positioned on the substrate 110. For example, a plurality of contact electrodes CCE may be positioned to be spaced apart from the plurality of banks BNK and the plurality of signal wire TL. Each of the plurality of second electrodes CE2 may overlap at least one contact electrode CCE. For example, one second electrode CE2 may overlap a plurality of contact electrodes CCE.

For example, a plurality of contact electrodes CCE may be electrically connected to a plurality of second electrodes CE2. The plurality of contact electrodes CCE are arranged between the substrate 110 and the plurality of second electrodes CE2 to supply the cathode voltage from the pixel driving circuit PD to the second electrodes CE2.

For example, when micro-LEDs are used as the light-emitting elements ED, the display device 1000 may be manufactured by forming a plurality of micro-LEDs on a wafer and transferring the micro-LEDs onto the substrate 110 of the display device 1000. Various defects may occur in the process of transferring a plurality of light-emitting elements ED having a fine size from a wafer to the substrate 110. For example, in some sub-pixels, there may be a non-transferred defect in which the light-emitting element ED is not transferred, and in other sub-pixels, there may be a defect caused by alignment error in which the light-emitting element ED is transferred out of position. In addition, the transfer process has been completed normally, but the transferred light-emitting element ED itself may be defective. Thus, a plurality of homogeneous light-emitting elements ED may be transferred to one sub-pixel, taking into account the defects during the transfer process of a plurality of light-emitting elements ED. A lighting test of the plurality of light-emitting elements ED is conducted, and only one light-emitting element ED that has been finally determined to be normal may be used.

For example, the first-first light-emitting element 130*a* and the first-second light-emitting element 130*b* may be transferred together onto one pixel PX and inspected for defects. If both the first-first light-emitting element 130*a* and the first-second light-emitting element 130*b* are determined to be normal, only the first-first light-emitting element 130*a* may be used and the first-second light-emitting element 130*b* may not be used. For another example, if only the first-second light-emitting element 130*b* is determined to be normal among the first-first light-emitting element 130*a* and the first-second light-emitting element 130*b*, the first-first light-emitting element 130*a* may not be used and only the first-second light-emitting element 130*b* may be used. Accordingly, even if multiple light-emitting elements ED of the same type are transferred onto a single pixel PX, only one light-emitting element ED may be used at the end.

As a result, one of a pair of light-emitting elements ED may be a main or primary light-emitting device ED and the other light-emitting element ED may be a redundancy light-emitting element ED. The redundancy light-emitting element ED may be a spare light-emitting element ED in preparation for a defect in the main light-emitting element ED. The redundancy light-emitting element ED may be used as a replacement in case the main light-emitting element ED is defective. Therefore, transferring the main and redundancy light-emitting elements ED together onto a single pixel PX may minimize the deterioration of the display quality due to the defects of the main and redundancy light-emitting elements ED.

For example, the first-first light-emitting element 130*a*, second-first light-emitting element 140*a*, and third-first light-emitting element 150*a* transferred to one pixel PX may be used as the main light-emitting elements ED, and the first-second light-emitting element 130*b*, second-second light-emitting element 140*b*, and third-second light-emitting element 150*b* may be used as the redundancy light-emitting elements ED.

Figure 8:
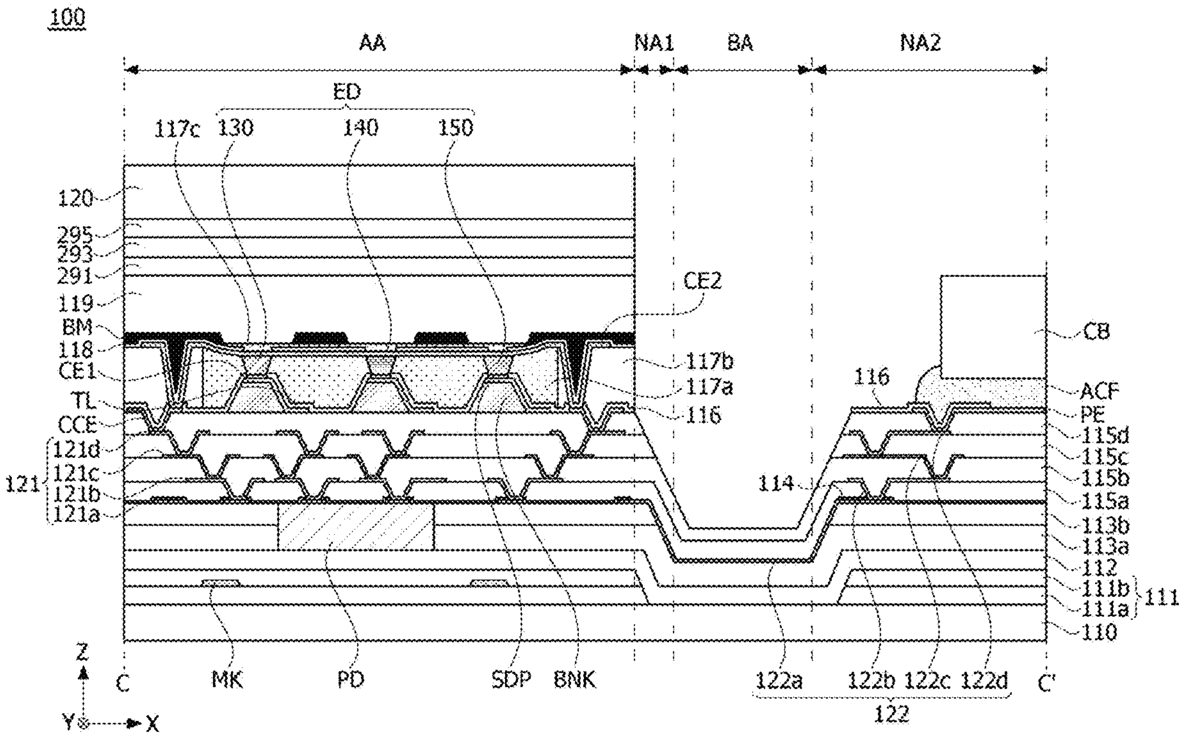
FIG. 8 is a cross-sectional view of the display device according to an embodiment of the present specification.
Figure 9:
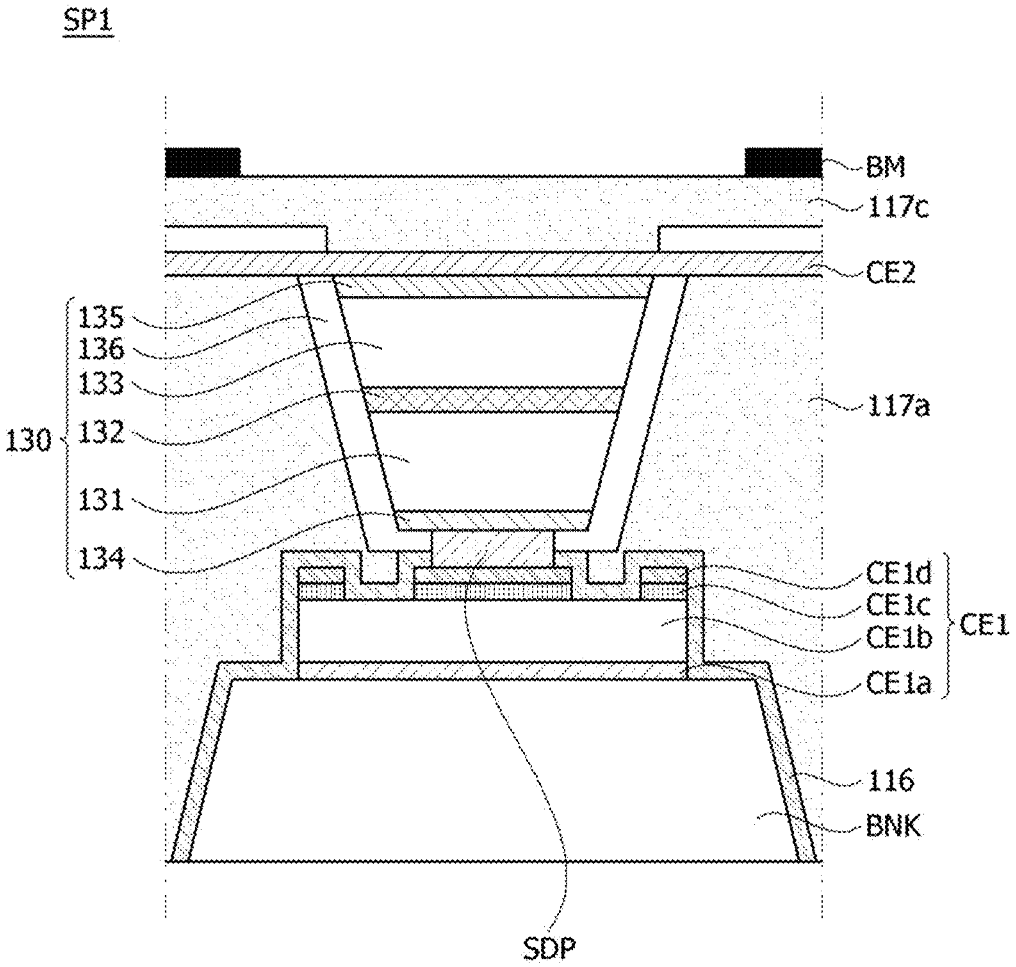
FIG. 9 is a cross-sectional view illustrating the display device according to an embodiment of the present specification.
Figure 10:
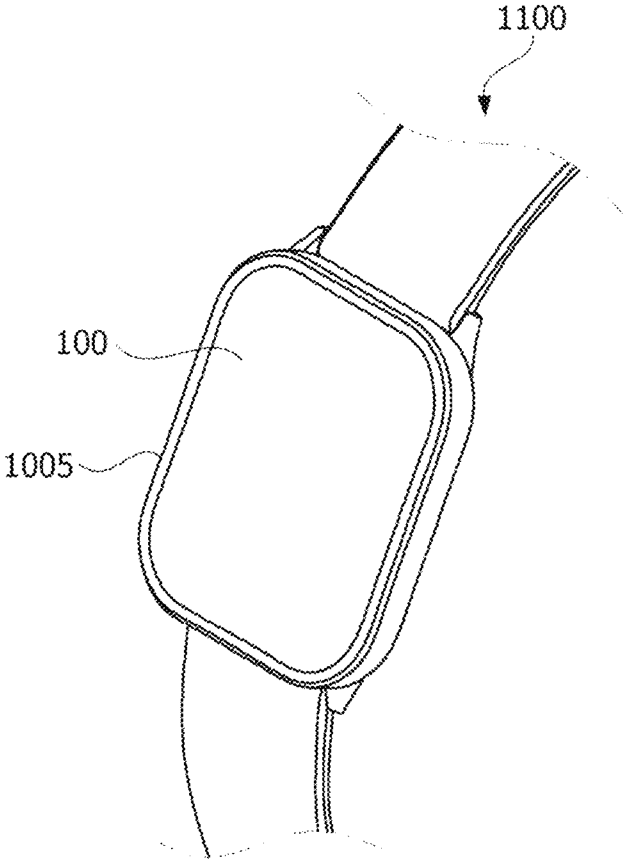
FIGS. 10 to 13 are diagrams illustrating an apparatus to which the display device according to embodiments of the present specification is applied.
Figure 11:
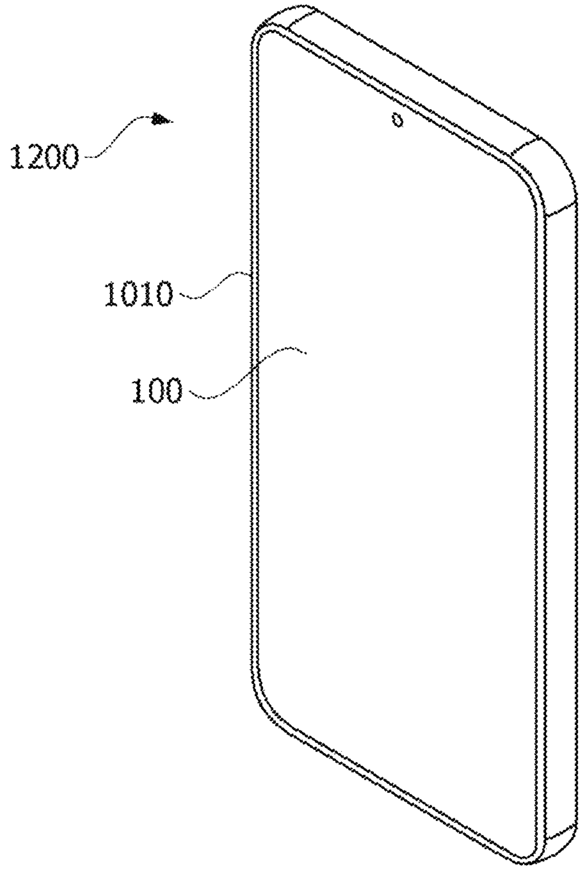
Figure 12:
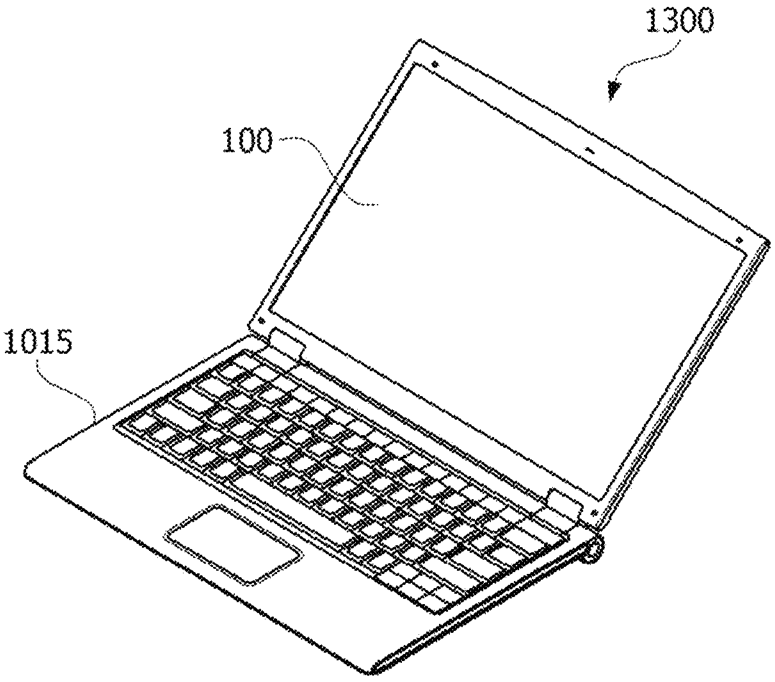
Figure 13:
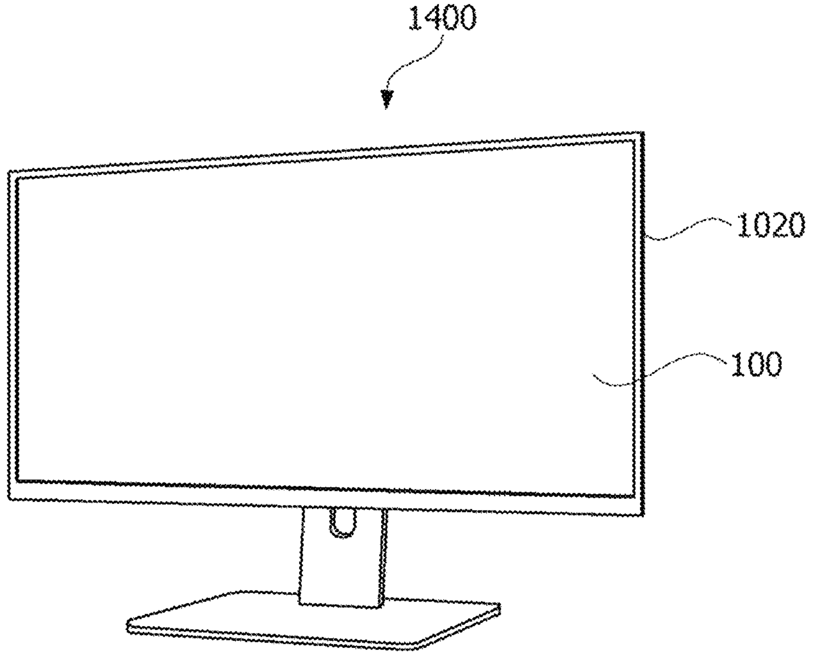

FIG. 8 is a cross-sectional view of the display device according to an embodiment of the present specification. FIG. 9 is a cross-sectional view illustrating the display device according to an embodiment of the present specification. For example, FIG. 9 is a cross-sectional view of the display area AA, the first non-display area NA1, the bending area BA, and the second non-display area NA2.

Referring to FIG. 8, a first buffer layer 111*a* and a second buffer layer 111*b* may be arranged on the remaining areas of the substrate 110 except for the bending area BA.

The first buffer layer 111*a* and the second buffer layer 111*b* may be arranged in the display area AA, the first non-display area NA1, and the second non-display area NA2. The first buffer layer 111*a* and the second buffer layer 111*b* may reduce the penetration of moisture or impurities through the substrate 110. The first buffer layer 111*a* and the second buffer layer 111*b* may be made of an inorganic insulating material. For example, the first buffer layer 111*a* and the second buffer layer 111*b* may be formed of a single layer or a multi-layer of silicon oxide (SiOx) or silicon nitride (SiNx), but embodiments of the present specification are not limited thereto.

For example, portions of the first buffer layer 111*a* and the second buffer layer 111*b* on the bending area BA may be removed. The top surface of the substrate 110 located in the bending area BA may be exposed from the first buffer layer 111*a* and the second buffer layer 111*b*. By removing the first buffer layer 111*a* and the second buffer layer 111*b*, which are made of an inorganic insulating material, from the bending area BA, cracking of the first buffer layer 111*a* and the second buffer layer 111*b* that may occur during bending may be minimized.

A plurality of alignment keys MK may be positioned between the first buffer layer 111*a* and the second buffer layer 111*b*. The plurality of alignment keys MK may be configured to identify the position of the pixel driving circuit PD during the manufacturing process of the display device 1000. For example, a plurality of alignment keys MK may be configured to align the position of the pixel driving circuit PD that is transferred onto the adhesive layer 112. In another example, the plurality of alignment keys MK may be omitted.

An adhesive layer 112 may be arranged on the second buffer layer 111*b*. The adhesive layer 112 may be arranged in the display area AA and the first non-display area NA1, the bending area BA, and the second non-display area NA2. For another example, at least a portion of the adhesive layer 112 may be removed from the non-display area NA that includes the bending area BA. For example, the adhesive layer 112 may be made of any of a polymer, epoxy resin, UV curable resin, polyimide-based, acrylate-based, urethane-based, and polydimethylsiloxane (PDMS), but embodiments of the present specification are not limited thereto.

In the display area AA, the pixel driving circuit PD may be arranged on the adhesive layer 112. If the pixel driving circuit PD is implemented as a drive driver, the drive driver may be mounted on the adhesive layer 112 by a transfer process, but embodiments of the present specification are not limited thereto.

A first protective layer 113*a* and a second protective layer 113*b* may be arranged on the adhesive layer 112 and the pixel driving circuit PD. The first protective layer 113*a* and the second protective layer 113*b* may be arranged to surround the side surfaces of the pixel driving circuit PD, but embodiments of the present specification are not limited thereto. For example, the second protective layer 113*b* may be arranged to cover at least a portion of the top surface of the pixel driving circuit PD. For example, at least one of the first protective layer 113*a* and the second protective layer 113*b* arranged on the bending area BA may be omitted. For example, the first protective layer 113*a* may be arranged entirely in the display area AA and the non-display area NA, and the second protective layer 113*b* may be arranged partially in the display area AA, the first non-display area NA1, and the second non-display area NA2. For example, a portion of the second protective layer 113*b* in the bending area BA may be removed. However, embodiments of the present specification are not limited thereto.

The first protective layer 113*a* and the second protective layer 113*b* may be formed of an organic insulating material, but embodiments of the present specification are not limited thereto. For example, the first protective layer 113*a* and the second protective layer 113*b* may be formed of a photo resist, polyimide (PI), or photo acryl-based material, but embodiments of the present specification are not limited thereto. For example, the first protective layer 113*a* and the second protective layer 113*b* may be an overcoating layer or an insulating layer, but embodiments of this specification are not limited thereto.

According to the present specification, the plurality of first connection wires 121 may be arranged on the second protective layer 113*b* in the display area AA. The plurality of first connection wires 121 may be wires for electrically connecting the pixel driving circuit PD to other components. For example, the pixel driving circuit PD may be electrically connected through the plurality of first connection wires 121 to the plurality of signal wires TL and the plurality of contact electrodes CCE, and the like. For example, the plurality of first connection wires 121 may include a first-first connection wire 121*a*, a first-second connection wire 121*b*, a first-third connection wire 121*c*, and a first-fourth connection wire 121*d*, but embodiments of the present specification are not limited thereto.

For example, a plurality of first-first connection wire 121*a* may be arranged on the second protective layer 113*b*. The plurality of first-first connection wires 121*a* may be electrically connected to the pixel driving circuit PD. The plurality of first-first connection wires 121*a* may transmit the voltage output from the pixel driving circuit PD to the first electrode CE1 or the second electrode CE2.

For example, a third protective layer 114 may be arranged on the second protective layer 113*b*. The third protective layer 114 may be entirely arranged in the display area AA and the non-display area NA. In the bending area BA, the third protective layer 114 may cover the side surface of the second protective layer 113*b* and the top surface of the first protective layer 113*a*. The third protective layer 114 may be formed of an organic insulating material. For example, the third protective layer 114 may be formed of a photo resist, polyimide (PI), or photo acryl-based material, but embodiments of the present specification are not limited thereto. For example, the first protective layer 113*a*, the second protective layer 113*b*, and the third protective layer 114 may be formed of the same material, but embodiments of the present specification are not limited thereto. Embodiments of the present specification are not limited to those described above. For example, a first protective layer 113*a*, a second protective layer 113*b*, and a third protective layer 114 may be insulating layers.

The plurality of first-second connection wires 121*b* may be arranged on the third protective layer 114. The plurality of first-second connection wires 121*b* may be connected to or directly connected to the pixel driving circuit PD. For example, some of the first-second connection wires 121*b* may be directly connected to the pixel driving circuit PD through contact holes in the third protective layer 114. The other of the first-second connection wires 121*b* may be electrically connected to the first-first connection wire 121*a* through the contact holes in the third protective layer 114. However, embodiments of the present specification are not limited thereto. The voltage output from the pixel driving circuit PD may be transmitted to the first electrode CE1 or the second electrode CE2 through connection wires other than the plurality of first-second connection wires 121*b*.

A first insulating layer 115*a* may be formed on the plurality of first-second connection wires 121*b*. The first insulating layer 115*a* may be entirely arranged in the display area AA and the non-display area NA, but embodiments of the present specification are not limited thereto. The first insulating layer 115*a* may be formed of an organic insulating material, but embodiments of the present specification are not limited thereto. For example, the first insulating layer 115*a* may be formed of a photo resist, polyimide (PI), or photo acryl-based material, but embodiments of the present specification are not limited thereto.

The plurality of first-third connection wires 121*c* may be arranged on the first insulating layer 115*a*. The first-third connection wires 121*c* may be electrically connected to the plurality of first-second connection wire 121*b*. For example, the first-third connection wires 121*c* may be electrically connected to the first-second connection wires 121*b* through contact holes of the first insulating layer 115*a*.

A second insulating layer 115*b* may be arranged on the plurality of first-third connection wires 121*c*. The second insulating layer 115*b* may be arranged in the remaining area except for the bending area BA, but embodiments of the present specification are not limited thereto. The second insulating layer 115*b* may be arranged in the display area AA, the first non-display area NA1, and the second non-display area NA2, but embodiments of the present specification are not limited thereto. For example, a portion of the second protective layer 115*b* in the bending area BA may be removed. The second insulating layer 115*b* may be formed of an organic insulating material, but embodiments of the present specification are not limited thereto. For example, the second insulating layer 115*b* may be formed of a photo resist, polyimide (PI), or photo acryl-based material, but embodiments of the present specification are not limited thereto.

The plurality of first-fourth connection wires 121*d* may be arranged on the second insulating layer 115*b*. The plurality of first-fourth connection wires 121*d* may be electrically connected to the plurality of first-third connection wires 121*c*. For example, the first-fourth connection wires 121*d* may be electrically connected to the first-third connection wires 121*c* via contact holes of the second insulating layer 115*b*.

According to the present specification, the plurality of second connection wires 122 may be arranged on the second protective layer 113*b* in the non-display area NA. The plurality of second connection wires 122 may be wires for transmitting signals, which are transmitted from the flexible circuit board (or flexible film) CB and the printed circuit board (160 in FIG. 1) to the pad part PAD, to the pixel driving circuit PD of the display area AA. For example, the plurality of second connection wires 122 may be electrically connected to the plurality of pad electrodes PE to receive signals from the flexible circuit board (or flexible film) CB and the printed circuit board.

For example, the plurality of second connection wires 122 may extend from the pad part PAD toward the display area AA to transmit signals to the wires in the display area AA. In this case, the plurality of second connection wires 122 may function as the link wires LL. The plurality of second connection wires 122 may include a second-first connection wire 122*a*, a second-second connection wire 122*b*, a second-third connection wire 122*c*, and a second-fourth connection wire 122*d*.

The plurality of second-first connection wires 122*a* may be arranged on the second protective layer 113*b*. The plurality of second-first connection wires 122*a* may extend from the second non-display area NA2 to the bending area BA and the first non-display area NA1. The plurality of second-first connection wire 122*a* may transmit signals, which has been transmitted from the flexible circuit board (or flexible film) CB and the printed circuit board to the pad part PAD, to the pixel driving circuit PD of the display area AA.

The plurality of first-second connection wires 122*b* may be arranged on the third protective layer 114. The plurality of second-second connection wires 122*b* may be arranged on the second non-display area NA2. The second-second connection wires 122*b* may be electrically connected to the second-first connection wires 122*a* through contact holes in the third protective layer 114. Thus, the signals from the flexible circuit board (or flexible film) CB and the printed circuit board may be transmitted to the second-first connection wires 122*a* through the second-second connection wires 122*b*.

The plurality of second-third connection wires 122*c* may be arranged on the first insulating layer 115*a*. The second-third connection wires 122*c* may be arranged in the second non-display area NA2. The second-third connection wires 122*c* may be electrically connected to the second-second connection wires 122*b* through contact holes in the first insulating layer 115*a*. Thus, the signals from the flexible circuit board (or flexible film) CB and the printed circuit board may be transmitted to the second-first connection wires 122*a* through the second-third connection wires 122*c* and the second-second connection wires 122*b*.

The plurality of second-fourth connection wires 122*d* may be arranged on the second insulating layer 115*b*. The second-fourth connection wires 122*d* may be arranged in the second non-display area NA2. The second-fourth connection wires 122*d* may be electrically connected to the second-third connection wires 122*c* through contact holes in the second insulating layer 115*b*. Thus, the signals from the flexible circuit board (or flexible film) CB and the printed circuit board may be transmitted to the second-first connection wires 122*a* through the second-fourth connection wires 122*d*, the second-third connection wires 122*c*, and the second-second connection wire 122*b*.

The plurality of first connection wires 121 and the plurality of second connection wires 122 may be formed of any one of a conductive material having excellent ductility or various conductive materials used in the display area AA. For example, the second connection wire 122, a portion of which is arranged in the bending area BA, may be made of a conductive material having excellent ductility, such as gold (Au), silver (Ag), or aluminum (Al), but embodiments of the present specification are not limited thereto. For another example, the plurality of first connection wires 121 and the plurality of second connection wires 122 may be formed of molybdenum (Mo), chromium (Cr), titanium (Ti), nickel (Ni), neodymium (Nd), copper (Cu), and alloys of silver (Ag) and magnesium (Mg), or alloys thereof, but embodiments of the present specification are not limited thereto.

A third insulating layer 115*c* may be arranged on the plurality of first connection wires 121 and the plurality of second connection wires 122. The third insulating layer 115*c* may be arranged in the remaining area except for the bending area BA, but embodiments of the present specification are not limited thereto. The third insulating layer 115*c* may be arranged in the display area AA, the first non-display area NA1, and the second non-display area NA2. A portion of the third insulating layer 115*c* in the bending area BA may be removed. The third insulating layer 115*c* may be formed of an organic insulating material, but embodiments of the present specification are not limited thereto. For example, the third insulating layer 115*c* may be formed of a photo resist, polyimide (PI), or photo acryl-based material, but embodiments of the present specification are not limited thereto.

In the display area AA, the plurality of banks BNK may be arranged on the third insulating layer 115*c*. The plurality of banks BNK may be arranged to overlap each of the plurality of sub-pixels. One or more light-emitting elements ED of the same type may be arranged in the upper portion of each of the plurality of banks BNK.

In the display area AA, the plurality of signal wires TL may be arranged on the third insulating layer 115*c*. The plurality of signal wires TL may be arranged in an area between the plurality of banks BNK. For example, the plurality of signal wires TL may be arranged adjacent to any one of the plurality of banks BNK.

The plurality of contact electrodes CCE may be arranged on the third insulating layer 115*c* in the display area AA. The plurality of contact electrodes CCE may supply the cathode voltage from the pixel driving circuit PD to the second electrode CE2.

The first electrode CE1 may be arranged on the bank BNK. For example, the first electrode CE1 may be arranged extending from the adjacent signal wire TL toward the upper portion of the bank BNK. The first electrode CE1 may be arranged on the top surface of the bank BNK and the side surface of the bank BNK. For example, the first electrode CE1 may be arranged extending from the signal wire TL on the top surface of the third insulating layer 115*c* to the side surface of the bank BNK and to the top surface of the bank BNK.

Referring to FIG. 9, the first electrode CE1 may be composed of a plurality of conductive layers. For example, the first electrode CE1 may include a first conductive layer CE1*a*, a second conductive layer CE1*b*, a third conductive layer CE1*c*, and a fourth conductive layer CE1*d*, but embodiments of the present specification are not limited thereto.

The first conductive layer CE1*a* may be arranged on the bank BNK. The second conductive layer CE1*b* may be arranged on the first conductive layer CE1*a*. The third conductive layer CE1*c* may be arranged on the second conductive layer CE1*b*. The fourth conductive layer CE1*d* may be arranged on the third conductive layer CE1*c*. For example, each of the first conductive layer CE1*a*, second conductive layer CE1*b*, third conductive layer CE1*c*, and fourth conductive layer CE1*d* may be formed of Titanium (Ti), Molybdenum (Mo), Aluminum (Al), or Indium Tin Oxide (ITO), but embodiments of the present specification are not limited thereto.

According to the present specification, some of the plurality of conductive layers constituting the first electrode CE1 and having good reflection efficiency may be configured as alignment keys and/or reflectors for aligning the light-emitting element ED. For example, the second conductive layer CE1*b* of the plurality of conductive layers of the first electrode CE1 may include a reflective material. For example, the second conductive layer CE1*b* may include aluminum (Al), but embodiments of the present specification are not limited thereto. In this way, the second conductive layer CE1*b* may be configured as a reflector. Further, the high reflective efficiency of the second conductive layer CE1*b* may facilitate easy identification during the manufacturing process, allowing for alignment of the light-emitting element ED or its transfer position relative to the second conductive layer CE1*b*.

For example, in order to configure the second conductive layer CE1*b* as a reflector, the third conductive layer CE1*c* and the fourth conductive layer CE1*d* covering the second conductive layer CE1*b* may be partially removed or etched away. For example, portions of the third conductive layer CE1*c* and fourth conductive layer CE1*d* arranged on the bank BNK may be partially removed or etched to expose the top surface of the second conductive layer CE1*b*. For example, the third conductive layer CE1*c* and the fourth conductive layer CE1*d*, except for the center portion and the border portions (or edge portions) of these layers where a solder pattern SDP is placed, may be removed. For example, the border portion (or edge portion) of each of the third conductive layer CE1*c* made of titanium (Ti), and the fourth conductive layer CE1*d* made of indium tin oxide (ITO) may not be etched. Accordingly, the other conductive layers of the first electrode CE1 may be prevented from being corroded by the TMAH (TetraMethylAmmoniumHydroxide) solution used in the masking process of the first electrode CE1.

According to the present specification, the first conductive layer CE1*a* and the third conductive layer CE1*c* may include titanium (Ti) or molybdenum (Mo). The second conductive layer CE1*b* may include aluminum (Al). The fourth conductive layer CE1*d* may include a transparent conductive oxide layer such as indium tin oxide (ITO) or indium zinc oxide (IZO) which has good adhesion to the solder pattern SDP and has corrosion resistance and acid resistance. However, embodiments of the present specification are not limited thereto.

The first conductive layer CE1*a*, the second conductive layer CE1*b*, the third conductive layer CE1*c*, and the fourth conductive layer CE1*d* may be sequentially deposited and then patterned by a photolithography process and an etching process, but embodiments of the present specification are not limited thereto.

According to the present specification, the signal wire TL, the contact electrode CCE, and the pad electrode PE arranged in the same layer as the first electrode CE1 may be formed of a multi-layer of a conductive material, but embodiments of the present specification are not limited thereto. For example, the signal wire TL, the contact electrode CCE, and the pad electrode PE may be made of a multi-layer of indium tin oxide (ITO)/titanium (Ti)/aluminum (Al)/titanium (Ti), but embodiments of the present specification are not limited thereto.

According to the present specification, the solder pattern SDP may be arranged on the first electrode CE1 in each of the plurality of sub-pixels. The solder pattern SDP may bond the light-emitting element ED to the first electrode CE1. The first electrode CE1 and the light-emitting element ED may be electrically connected each other through eutectic bonding using the solder pattern SDP, but embodiments of the present specification are not limited thereto. For example, a first electrode CE1 and an anode electrode 134 of a light-emitting element ED may be electrically connected through eutectic bonding by a solder pattern SDP, but the embodiments of the present specification are not limited thereto. For example, if the solder pattern SDP is formed of indium (In) and the anode electrode 134 of the light-emitting element ED is formed of gold (Au), the solder pattern SDP and the anode electrode 134 may be bonded by applying heat and pressure during the transfer process of the light-emitting element ED. The eutectic bonding may allow the light-emitting element ED to be bonded to the solder pattern SDP and the first electrode CE1 without separate adhesives. For example, the solder pattern SDP may be formed of indium (In), tin (Sn), or an alloy thereof, but embodiments of the present specification are not limited thereto. For example, the solder pattern SDP may be a bonding pad, or a binding pad, but embodiments of the present specification are not limited thereto.

According to the present specification, a passivation layer 116 may be arranged on the plurality of signal wires TL, the plurality of first electrodes CE1, the plurality of contact electrodes CCE, and the third insulating layer 115*c*. For example, the passivation layer 116 may be arranged in the display area AA, the first non-display area NA1, and the second non-display area NA2. A portion of the passivation layer 116 arranged in the bending area BA may be removed. A portion of the passivation layer 116 covering the plurality of pad electrodes PE in the second non-display area NA2 may be removed. The passivation layer 116 may be arranged to cover the remaining areas except the area in which the bending area BA, the plurality of pad electrodes PE, and the solder pattern SDP are arranged, thereby reducing moisture or impurities to penetrate into the light-emitting element ED. For example, the passivation layer 116 may be formed of a single or multiple layers of silicon oxide (SiOx) or silicon nitride (SiNx), but embodiments of the present specification are not limited thereto. For example, the passivation layer 116 may be a protective layer, an insulating layer, or the like, but embodiments of the present specification are not limited thereto. For example, the passivation layer 116 may include a hole that expose the solder pattern SDP.

The light-emitting element ED may be arranged on the solder pattern SDP in each of the plurality of sub-pixels. The first light-emitting element 130 may be arranged in the first sub-pixel SP1. The second light-emitting element 140 may be arranged in the second sub-pixel SP2. The third light-emitting element 150 may be arranged in the third sub-pixel SP3.

The light-emitting element ED may be formed on a silicon wafer by a method such as metal organic vapor deposition (MOCVD), chemical vapor deposition (CVD), plasma-enhanced chemical vapor deposition (PECVD), molecular beam growth (MBE), hydride vapor deposition (HVPE), or sputtering, but embodiments of the present specification are not limited thereto.

Referring to FIG. 9, the first light-emitting element 130 may include the anode electrode 134, a first semiconductor layer 131, an active layer 132, a second semiconductor layer 133, the cathode electrode 135, and an encapsulation layer 136, but embodiments of the present specification are not limited thereto. For example, the encapsulation layer 136 may not be included in the first light-emitting element 130.

The first semiconductor layer 131 may be arranged on the solder pattern SDP. The second semiconductor layer 133 may be arranged on the first semiconductor layer 131.

For example, one of the first semiconductor layer 131 and the second semiconductor layer 133 may be implemented as a compound semiconductor, such as a III-V group, II-VI group, or the like, and may be doped with impurities (or dopants). For example, one of the first semiconductor layer 131 and the second semiconductor layer 133 may be a semiconductor layer doped with n-type impurities, and the other may be a semiconductor layer doped with p-type impurities, but embodiments of the present specification are not limited thereto. For example, one or more of the first semiconductor layer 131 and the second semiconductor layer 133 may be a layer doped with n-type or p-type impurities on a material such as gallium nitride (GaN), gallium phosphide (GaP), aluminum gallium indium phosphide (AlGaInP), indium gallium nitride (AlGaN), aluminum indium nitride (AlInN), aluminum gallium nitride (AlInGaN), aluminum gallium gallium nitride (AlGaAs), aluminum gallium arsenide (AlGaAs), or gallium arsenide (GaAs), but embodiments of the present specification are not limited thereto. For example, the n-type impurity may be silicon (Si), germanium (Ge), selenium (Se), carbon (C), tellurium (Te), or tin (Sn), but embodiments of the present specification are not limited thereto. For example, the p-type impurity may be magnesium (Mg), zinc (Zn), calcium (Ca), strontium (Sr), barium (Ba), or beryllium (Be), but embodiments of the present specification are not limited thereto.

For example, the first semiconductor layer 131 and the second semiconductor layer 133 may be a nitride semiconductor containing n-type impurities and a nitride semiconductor containing p-type impurities, respectively, but embodiments of the present specification are not limited thereto. For example, the first semiconductor layer 131 may be a nitride semiconductor containing p-type impurities, and the second semiconductor layer 133 may be a nitride semiconductor containing n-type impurities, but embodiments of the present specification are not limited thereto.

The active layer 132 may be arranged between the first semiconductor layer 131 and the second semiconductor layer 133. The active layer 132 may emit light by receiving holes and electrons from the first semiconductor layer 131 and the second semiconductor layer 133. For example, the active layer 132 may be composed of one of a single well structure, a multi-well structure, a single quantum well structure, a multi-quantum well (MQW) structure, a quantum dot structure, and a quantum line structure, but embodiments of the present specification are not limited thereto. For example, the active layer 132 may be formed of indium gallium nitride (InGaN) or gallium nitride (GaN), but embodiments of the present specification are not limited thereto.

For another example, the active layer 132 may include a multi quantum well (MQW) structure having a well layer and a barrier layer with a higher band gap than the well layer. For example, the active layer 132 may be formed of InGaN as a well layer and AlGaN layer as a barrier layer, but embodiments of the present specification are not limited thereto.

The anode electrode 134 may be arranged between the first semiconductor layer 131 and the solder pattern SDP. For example, the anode electrode 134 may electrically connect the first semiconductor layer 131 and the first electrode CE1. The anode voltage output from the pixel driving circuit PD may be applied to the first semiconductor layer 131 through the signal wire TL, the first electrode CE1, and the anode electrode 134. For example, the anode electrode 134 may be formed of a conductive material that is eutectically bondable with the solder pattern SDP, but embodiments of the present specification are not limited thereto. For example, the anode electrode 134 may be formed of gold (Au), tin (Sn), tungsten (W), silicon (Si), silver (Ag), titanium (Ti), iridium (Ir), chromium (Cr), indium (In), zinc (Zn), lead (Pb), nickel (Ni), platinum (Pt), and copper (Cu), or alloys thereof, but embodiments of the present specification are not limited thereto.

The cathode electrode 135 may be arranged on the second semiconductor layer 133. For example, the cathode electrode 135 may electrically connect the second semiconductor layer 133 and the second electrode CE2. The cathode voltage output from the pixel driving circuit PD may be applied to the second semiconductor layer 133 through the contact electrode CCE, the second electrode CE2, and the cathode electrode 135. The cathode electrode 135 may be formed of a transparent conductive material to allow light emitted from the ED to be directed to the upper portion of the ED, but embodiments of the present specification are not limited thereto. For example, the cathode electrode 135 may be formed of a material such as Indium Tin Oxide (ITO), Indium Zinc Oxide (IZO), or Indium Gallium Zinc Oxide (IGZO), but embodiments of the present specification are not limited thereto.

The encapsulation layer 136 may be arranged on at least a portion of the first semiconductor layer 131, the active layer 132, the second semiconductor layer 133, the anode electrode 134, and the cathode electrode 135. For example, the encapsulation layer 136 may surround at least a portion of the first semiconductor layer 131, the active layer 132, the second semiconductor layer 133, the anode electrode 134, and the cathode electrode 135.

For example, the encapsulation layer 136 may protect the first semiconductor layer 131, the active layer 132, and the second semiconductor layer 133. For example, the encapsulation layer 136 may be arranged on a side surface of the first semiconductor layer 131, a side surface of the active layer 132, and a side surface of the second semiconductor layer 133.

For example, the encapsulation layer 136 may be arranged on at least portions of the anode electrode 134 and the cathode electrode 135, such as an edge portion (or one side) of the anode electrode 134 and an edge portion (or one side) of the cathode electrode 135. At least a portion of the anode electrode 134 may be exposed from the encapsulation layer 136, allowing the anode electrode 134 and the solder pattern SDP to be connected. For example, at least a portion of the cathode electrode 135 may be exposed from the encapsulation layer 136, allowing the cathode electrode 135 and the second electrode CE2 to be connected. For example, the encapsulation layer 136 may be formed of an insulating material such as silicon nitride (SiNx) or silicon oxide (SiOx), but embodiments of the present specification are not limited thereto.

For another example, the encapsulation layer 136 may have a structure in which a reflective material is dispersed in a resin layer, but embodiments of the present specification are not limited thereto. For example, the encapsulation layer 136 may be fabricated as a reflector having various structures, but embodiments of the present specification are not limited thereto. Light exciting from the active layer 132 by the encapsulation layer 136 is reflected upward to improve light extraction efficiency. For example, the encapsulation layer 136 may be a reflective layer, but embodiments of the present specification are not limited thereto.

Although the light-emitting element ED is described herein as having a vertical structure, embodiments of the present specification are not limited thereto. For example, the light-emitting element ED may have a lateral structure or a flip chip structure.

While the first light-emitting element 130 has been described with reference to FIG. 9, the second light-emitting element 140 and third light-emitting element 150 may have substantially the same structure as the first light-emitting element 130. For example, the second light-emitting element 140 and the third light-emitting element 150 may be substantially the same as the first light-emitting element 130 having the first semiconductor layer 131, the active layer 132, the second semiconductor layer 133, the anode electrode 134, the cathode electrode 135, and the encapsulating film 136.

According to the present specification, a first optical layer 117*a* may be arranged around a plurality of light-emitting elements ED in a display area AA. For example, the first optical layer 117*a* may surround the plurality of light-emitting elements ED. For example, the first optical layer 117*a* may cover between the bank BNK, a portion of the passivation layer 116, and the plurality of light-emitting elements ED. The first optical layer 117*a* may be arranged between or cover the plurality of light-emitting elements ED included in one pixel PX, and between the plurality of banks BNK. For example, the first optical layer 117*a* may extend in the first direction (X-axis direction), and may be spaced apart from the second direction (Y-axis direction). For example, the first optical layer 117*a* may be arranged between the passivation layer 116 and the second electrode CE2 to surround the side portions of the light-emitting element ED and the bank BNK, but embodiments of the present specification are not limited thereto. For example, the first optical layer 117*a* may be a diffusion layer, a sidewall diffusion layer, or the like, but embodiments of the present specification are not limited thereto.

The first optical layer 117*a* may include an organic insulating material in which fine particles are dispersed, but embodiments of the present specification are not limited thereto. For example, the first optical layer 117*a* may be formed of siloxane in which fine metal particles such as titanium dioxide ($TiO_2$) particles are dispersed, but embodiments of the present specification are not limited thereto. Light from the plurality of light-emitting elements ED may be scattered by the fine particles dispersed in the first optical layer 117*a* and emitted to the outside of the display device 1000. This may ensure that the first optical layer 117*a* improves the extraction efficiency of light emitted from the plurality of light-emitting elements ED.

For example, the first optical layer 117*a* may be arranged in each of the plurality of pixels PX, or may be arranged together in some of the pixels PX arranged in the same row, but embodiments of the present specification are not limited thereto. For example, the first optical layer 117*a* may be arranged in each of the plurality of pixels PX, or one first optical layer 117*a* may be shared by the plurality of pixels PX. For another example, each of the plurality of sub-pixels may separately include the first optical layer 117*a*, but embodiments of the present specification are not limited thereto.

According to the specification, the second optical layer 117*b* may be arranged on the passivation layer 116 in the display area AA. For example, the second optical layer 117*b* may be arranged around the first optical layer 117*a*. For example, the second optical layer 117*b* may be arranged to surround the first optical layer 117*a*. For example, the second optical layer 117*b* may abut the side surface of the first optical layer 117*a*. For example, the second optical layer 117*b* may be arranged in an area between the plurality of pixels PX. However, embodiments of the present specification are not limited thereto. For example, the second optical layer 117*b* may be a diffusion layer, a diffusion layer window, or a window diffusion layer, but embodiments of the present specification are not limited thereto.

The second optical layer 117*b* may be formed of an organic insulating material, but embodiments of the present specification are not limited thereto. The second optical layer 117*b* may be formed of the same material as the first optical layer 117*a*, but embodiments of the present specification are not limited thereto. For example, the first optical layer 117*a* may include fine particles, and the second optical layer 117*b* may not include fine particles. For example, the second optical layer 117*b* may be made of siloxane, but embodiments of the present specification are not limited thereto.

For example, the thickness of the first optical layer 117*a* may be less than the thickness of the second optical layer 117*b*, but embodiments of the present specification are not limited thereto. Accordingly, when viewed from a plan, the area in which the first optical layer 117*a* is arranged may include a concave portion recessed inwardly from the upper surface of the second optical layer 117*b*.

According to the present specification, the second electrode CE2 may be arranged on the first optical layer 117*a* and the second optical layer 117*b*. For example, the second electrode CE2 may be electrically connected to the plurality of contact electrodes CCE through contact holes in the second optical layer 117*b*. For example, the second electrode CE2 may be arranged on the plurality of light-emitting elements ED. For example, the second electrode CE2 may include a transparent conductive oxide such as indium tin oxide (ITO) or indium zinc oxide (IZO), but embodiments of the present specification are not limited thereto. For example, the second electrode CE2 may be arranged in contact with a cathode electrode 135. For example, the second electrode CE2 may overlap the first optical layer 117*a*. For example, the second electrode CE2 may cover the outer plane of the first optical layer 117*a*.

The second electrode CE2 may extend continuously in a first direction (X-axis direction) of the substrate 110.

Accordingly, it may be commonly connected to the plurality of pixels PX arranged in the first direction (X-axis direction) of the substrate 110. For example, the second electrode CE2 may be commonly connected to the plurality of pixels PX.

According to the present specification, the second electrode CE2 may extend continuously on the first optical layer 117*a*, the second optical layer 117*b*, and the light-emitting element ED. The area in which the first optical layer 117*a* is arranged may include a concave portion that is recessed inwardly from the upper surface of the second optical layer 117*b*. Accordingly, the first portion of the second electrode CE2 arranged on the first optical layer 117*a* is arranged along the concave portion, so that it may be located at a lower position than the second portion of the second electrode CE2 arranged on the second optical layer 117*b*.

A third optical layer 117*c* may be arranged on the second electrode CE2. The third optical layer 117*c* may be arranged to overlap the plurality of light-emitting elements ED and the first optical layer 117*a*. The third optical layer 117*c* may be arranged on the upper portion of the second electrode CE2 and the plurality of light-emitting elements ED, thereby improving the mura that may occur in some of the plurality of light-emitting elements ED. For example, when the plurality of light-emitting elements ED are transferred to the substrate 110 of the display device 1000, areas having non-uniform spacing between the plurality of light-emitting elements ED may occur due to process variations. If the spacing between the plurality of light-emitting elements ED is uneven, the emission areas of the plurality of light-emitting elements ED may be arranged uneven, resulting in the mura visible to the user. Since the third optical layer 117*c* may be formed to diffuse light uniformly onto over the plurality of light-emitting elements ED, it is possible to reduce the light emitted from some of the light-emitting elements ED from being visually recognized as the mura. Therefore, the light emitted from the plurality of light-emitting elements ED by the third optical layer 117*c* is uniformly diffused and extracted to the outside of the display device 1000, which may improve the luminance uniformity of the display device 1000.

The third optical layer 117*c* may be formed of an organic insulating material in which fine particles are dispersed, but embodiments of the present specification are not limited thereto. For example, the third optical layer 117*c* may be formed of siloxane dispersed with fine metal particles, such as titanium dioxide ($TiO_2$) particles, but embodiments of the present specification are not limited thereto. For example, the third optical layer 117*c* may be formed of the same material as the first optical layer 117*a*, but embodiments of the present specification are not limited thereto. For example, the third optical layer 117*c* may be a diffusion layer, a top surface diffusion layer, or the like, but embodiments of the present specification are not limited thereto.

According to the present specification, light from the plurality of light-emitting elements ED may be scattered by fine particles dispersed in the third optical layer 117*c* and emitted to the outside of the display device 1000. The third optical layer 117*c* may further improve luminance uniformity of the display device 1000 by uniformly mixing light emitted from the plurality of light-emitting elements ED. Further, light scattered from the plurality of fine particles may improve the light extraction efficiency of the display device 1000, thereby enabling the display device 1000 to be driven at low power.

A black matrix BM may be arranged on the second electrode CE2, the first optical layer 117*a*, the second optical layer 117*b*, and the third optical layer 117*c* in the display area AA. For example, the black matrix BM may fill the contact holes in the second optical layer 117*b*. The black matrix BM may be configured to cover the display area AA, thereby reducing the color mixing of light from the plurality of sub-pixels and reflection of external light. For example, the black matrix BM may also be arranged within the contact holes in which the second electrode CE2 and the contact electrode CCE are connected, which may prevent light leakage between the plurality of adjacent sub-pixels.

For example, the black matrix BM may be formed of an opaque material, but embodiments of the present specification are not limited thereto. For example, the black matrix BM may be a black pigment or an organic insulating material to which a black dye has been added, but embodiments of the present specification are not limited thereto.

In the display area AA, a cover layer 118 may be arranged on the black matrix BM. The cover layer 118 may protect the configuration under the cover layer 118. For example, the cover layer 118 may be formed of an organic insulating material, but embodiments of the present specification are not limited thereto. For example, the cover layer 118 may be formed of a photo resist, polyimide (PI), or photo acryl-based material, but embodiments of the present specification are not limited thereto. For example, the cover layer 118 may be an overcoating layer or an insulating layer, but embodiments of the present specification are not limited thereto.

The polarizing layer 293 may be arranged on the cover layer 118 through the first adhesive layer 291. The cover member 120 may be arranged on the polarizing layer 293 through the second adhesive layer 295. For example, the first adhesive layer 291 and the second adhesive layer 295 may include an optically clear adhesive (OCA), an optically clear resin (OCR), or a pressure sensitive adhesive (PSA), but embodiments of the present specification are not limited thereto.

According to the present specification, the plurality of pad electrodes PE may be arranged on the third insulating layer 115*c* in the second non-display area NA2. For example, at least a portion of the plurality of pad electrodes PE may be exposed from the passivation layer 116. For example, the plurality of pad electrodes PE may be electrically connected to the second-fourth connection wires 122*d* through contact holes in the third insulating layer 115*c*.

An adhesive layer ACF may be arranged on the plurality of pad electrode PE. The adhesive layer ACF may be an adhesive layer in which conductive balls are dispersed in an insulating material, but embodiments of the present specification are not limited thereto. When heat or pressure is applied to the adhesive layer ACF, the conductive balls may become electrically connected and have conductive properties at the points where heat or pressure is applied, exhibiting the conductive properties. The adhesive layer ACF may be arranged between the plurality of pad electrodes PE and the flexible circuit board (or flexible film) CB to attach or bond the flexible circuit board (or flexible film) CB to the plurality of pad electrodes PE. For example, the adhesive layer ACF may be an anisotropic conductive film (ACF), but embodiments of the present specification are not limited thereto.

The flexible circuit board (or flexible film) CB may be arranged on the adhesive layer ACF. The flexible circuit board (or flexible film) CB may be electrically connected to the plurality of pad electrodes PE through the adhesive layer ACF. Thus, signals output from the flexible circuit board (or flexible film) CB and the printed circuit board may be transmitted to the pixel driving circuit PD of the display area AA through the plurality of pad electrodes PE, the second-fourth connection wire 122*d*, the second-third connection wire 122$c$, the second-second connection wire 122$b$, and the second-first connection wire 122$a$.

FIGS. 10 to 13 are diagrams illustrating an apparatus to which the display device according to embodiments of the present specification is applied.

Referring to FIGS. 10 to 13, the display device 1000 according to embodiments of the present specification may be included in a variety of devices or electronics. For example, various electronic devices may include a wearable device 1100, a mobile device 1200, a laptop 1300, and a monitor or television (TV) 1400, but embodiments of the present specification are not limited thereto.

The wearable device 1100, the mobile device 1200, the laptop computer 1300, and the monitor or TV 1400 may include their respective case parts 1005, 1010, 1015, and 1020, and the display panel 100 and the display device 1000 according to the embodiments described above.

The display device according to an embodiment of the present specification may include a mobile device, a video phone, a smart watch, a watch phone, a wearable apparatus, a foldable apparatus, a rollable apparatus, a bendable apparatus, a flexible apparatus, a curved apparatus, a sliding apparatus, a variable apparatus, an electronic notebook, an e-book, a portable multimedia player (PMP), a personal digital assistant (PDA), an MP3 player, a mobile medical device, a desktop PC, a laptop PC, a netbook computer, a workstation, a navigation, an in-vehicle display device, an in-theater display device, a television, a wallpaper device, a signage device, a gaming device, a laptop, a monitor, a camera, a camcorder, and a main board of a consumer electronics device.

Hereinafter, a temperature compensation method of a display apparatus according to an embodiment of the present specification will be described.

FIGS. 14A to 14F are graphs illustrating optical characteristics of a light-emitting element with respect to temperature.

Figure 14A:
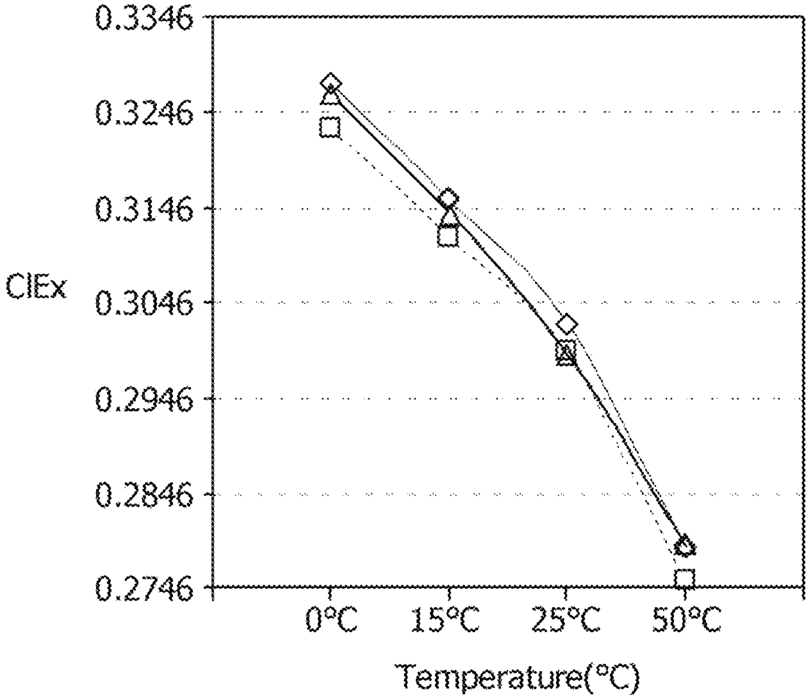
FIGS. 14A to 14F are graphs illustrating optical characteristics of a light-emitting element with respect to temperature.
Figure 14B:
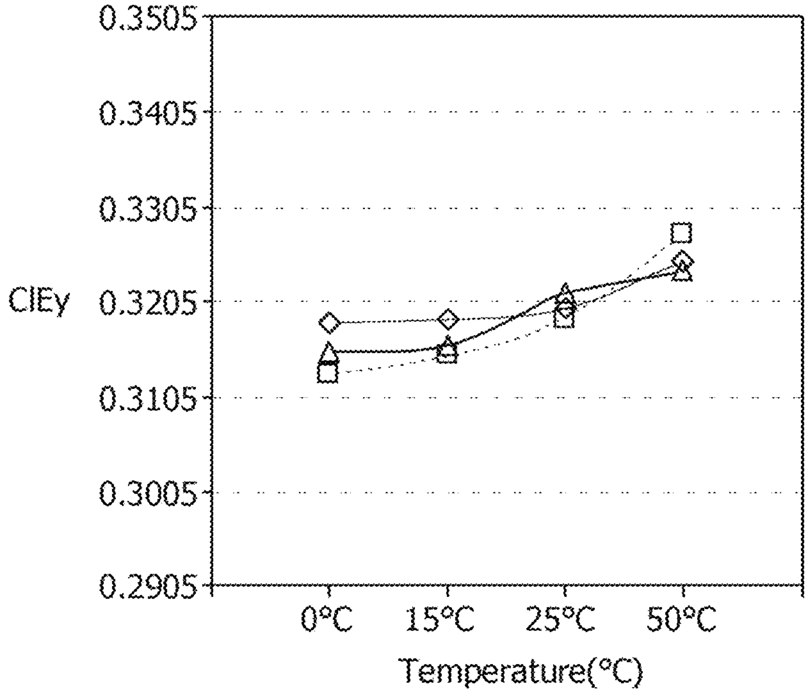
Figure 14C:
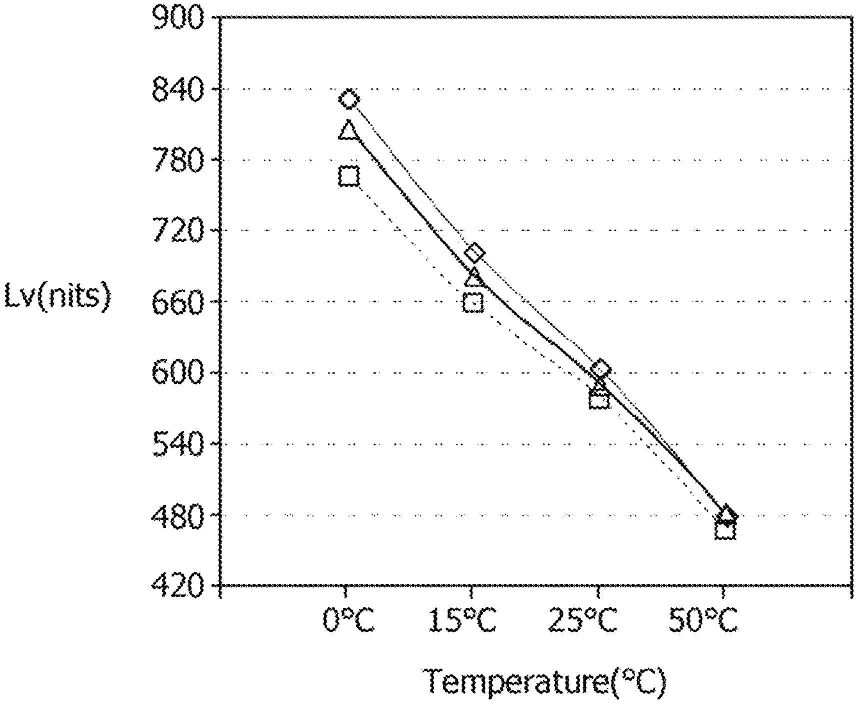
Figure 14D:
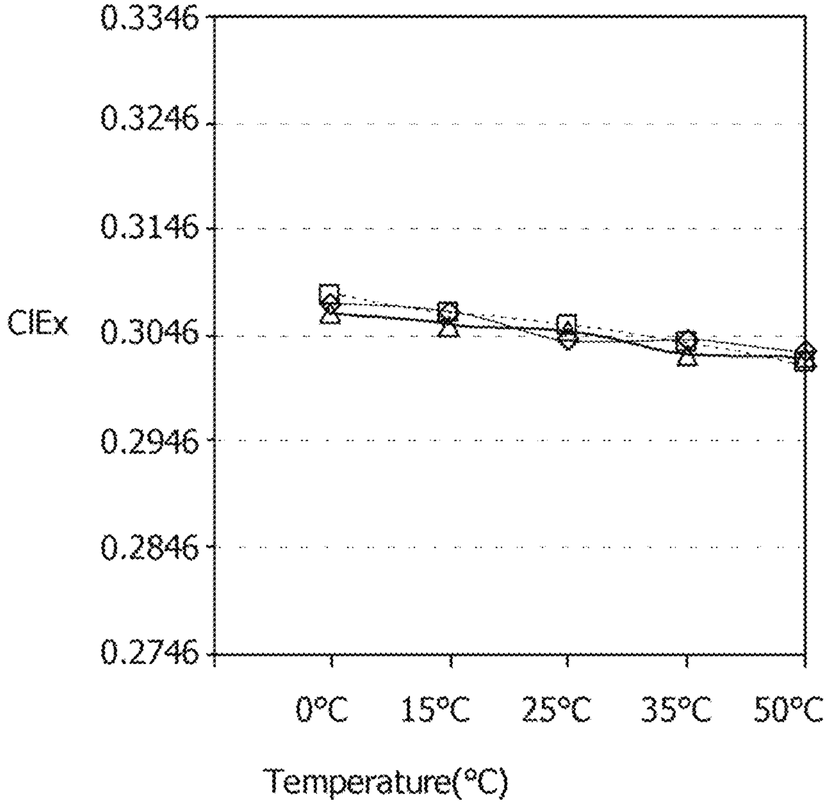
Figure 14E:
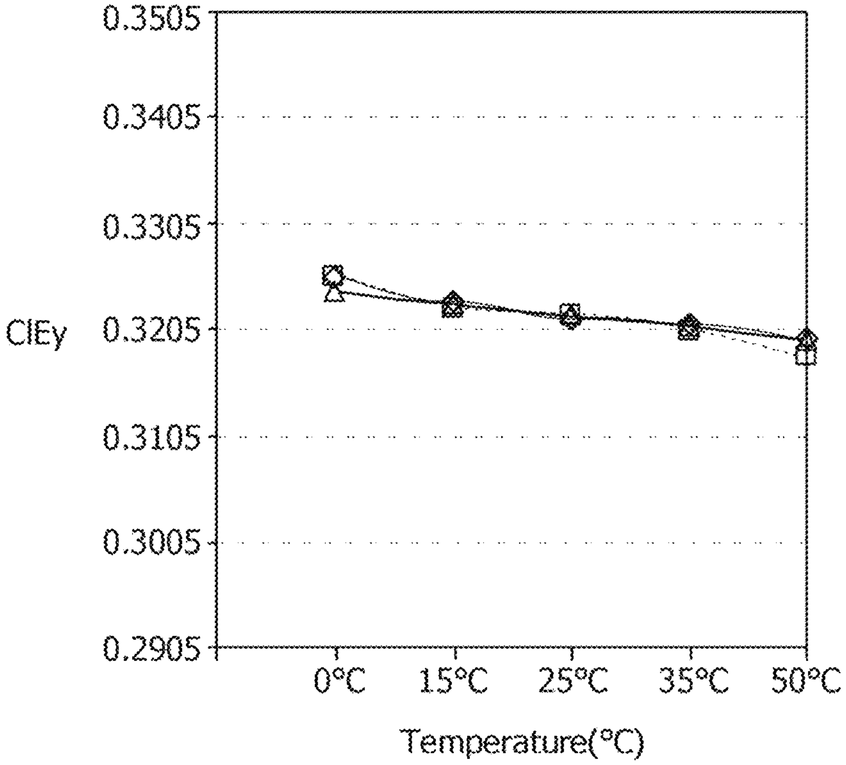
Figure 14F:
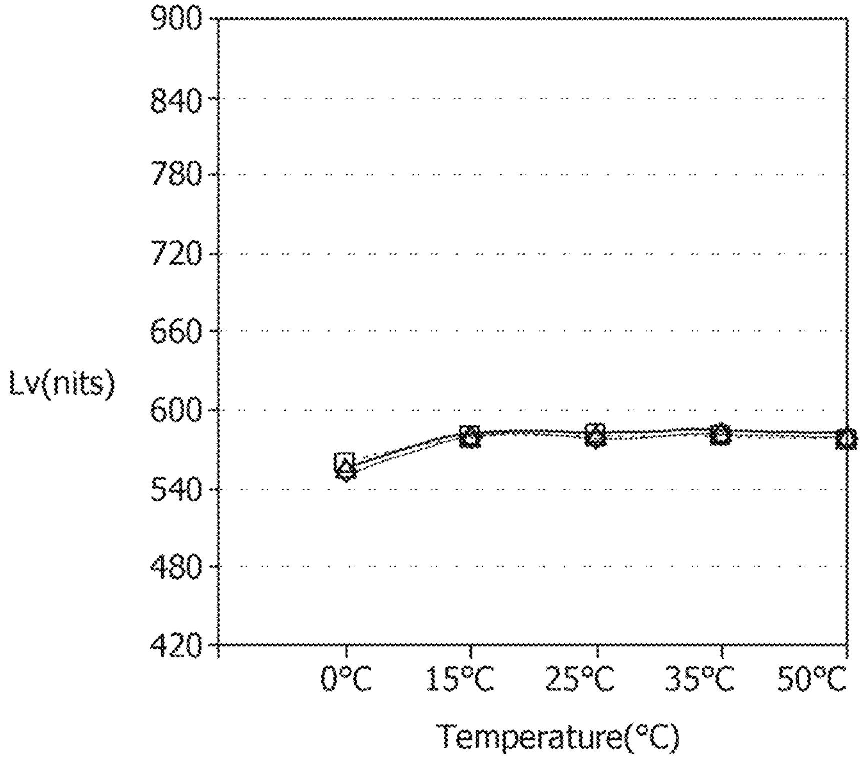

In FIGS. 14A to 14F, the horizontal axis represents temperature (° C.). The vertical axis in FIGS. 14A and 14D represents color coordinate x CIEx, the vertical axis in FIGS. 14B and 14E represents color coordinate y CIEy, and the vertical axis in FIGS. 14C and 14F represents luminance Lv (nits). Each graph with a different shape represents a plurality of test results, FIGS. 14A to 14C relate to a case where the light-emitting element is a micro light emitting diode (Micro LED), and FIGS. 14D to 14F relate to a case where the light-emitting element is an organic light emitting diode (OLED).

With respect to color coordinate x CIEx, the maximum variation in CIEx was measured to be 0.0489 in FIG. 14A and 0.0044 in FIG. 14D. Accordingly, it can be seen that the micro light emitting diode shown in FIG. 14A has a variation in color coordinate x CIEx approximately 11 times greater than that of the OLED shown in FIG. 14D.

With respect to color coordinate y CIEy, the maximum variation in CIEy was measured to be 0.0149 in FIG. 14B and 0.0052 in FIG. 14E. Accordingly, it can be seen that the micro light emitting diode shown in FIG. 14B has a variation in color coordinate y CIEy approximately 3 times greater than that of the OLED shown in FIG. 14E.

With respect to luminance Lv, the maximum variation in luminance Lv was measured to be 352.2 in FIG. 14C and 30.7 in FIG. 14F. Accordingly, it can be seen that the micro light emitting diode shown in FIG. 14C has a variation in Lv approximately 11 times greater than that of the OLED shown in FIG. 14F.

In the graphs of FIGS. 14D to 14F, the variation in color coordinates CIEx, CIEy, and luminance Lv of the OLED with respect to temperature change is not large, whereas in the graphs of FIGS. 14A to 14C, it can be seen that the variation in the color coordinates and luminance of the micro light emitting diode with respect to temperature change is significant.

Therefore, it can be seen that the OLED light-emitting element has a small variation in optical characteristics such as luminance and color coordinates according to temperature change, whereas the micro LED light-emitting element has a characteristic of exhibiting a large variation in optical performance according to temperature change.

Since the micro LED light-emitting element exhibits a large variation in optical performance according to temperature change, the optical characteristics at room temperature may not be appropriately applied at high temperatures. Due to environmental conditions in which a display apparatus including a micro LED is used or heat generation caused by components of the display apparatus, temperature change may also occur in the driving environment of the micro LED light-emitting element.

In relation to measuring the temperature inside the display apparatus that changes, as described above, a display apparatus 1000 according to an embodiment of the present specification may include a temperature sensing circuit or a temperature sensor for sensing the temperature of a display panel 100, and for example, may be located on a printed circuit board 160, but is not limited thereto. The temperature sensing circuit may sense the internal and external temperatures of the display apparatus 1000 and may transmit the sensed data to a timing controller or the like. For example, the temperature sensing circuit may sense the temperature and output the sensed temperature information so that the timing controller may perform a compensation operation for a specific device in response to a temperature change, but is not limited thereto.

Figure 15:
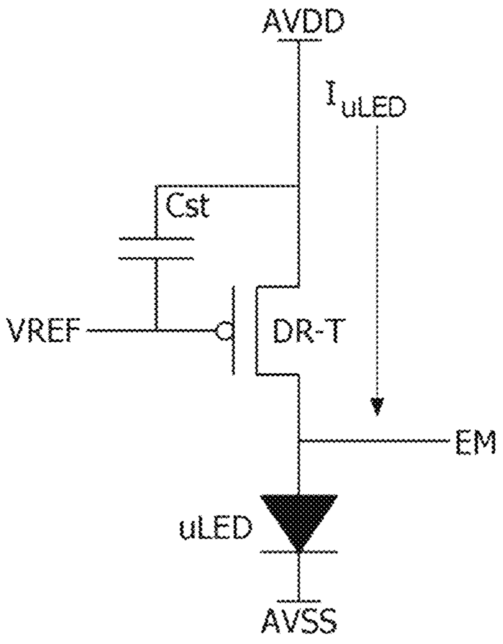
FIG. 15 is a diagram illustrating a pixel driving circuit structure according to an embodiment of the present specification.

FIG. 15 is a diagram illustrating a pixel driving circuit structure according to an embodiment of the present specification. A plurality of pixel driving circuits PD may be located in a display area AA of the display panel 100.

Referring to FIG. 15, a pixel driving circuit according to an embodiment of the present specification may include a driving transistor DR-T that controls a driving current applied to a micro LED light-emitting element uLED. Although a p-type transistor is illustrated as an example in one embodiment, the present specification is not limited thereto. Due to the characteristics of the device, unlike an OLED, a micro LED may exhibit a change in emission wavelength depending on the current density supplied. When luminance is controlled through current density, a change in the emission wavelength may occur, resulting in distortion in color representation for each gray level. Accordingly, the micro LED light-emitting element may be driven using a pulse width modulation (PWM) method that adjusts emission gray levels according to the on-pulse width of an emission signal EM (or an emission control signal).

In the PWM method, electrically, a reference voltage VREF may be applied to a gate electrode of a driving transistor DR-T, and a driving voltage AVDD may be applied to a first electrode of the driving transistor DR-T, such that a driving current $I_{uLED}$ may be supplied to a micro light-emitting element uLED in which an anode electrode is connected to a second electrode of the driving transistor DR-T and a ground voltage AVSS and a cathode electrode are connected. A storage capacitor Cst may be connected between a gate electrode and a first electrode of the driving transistor DR-T to continuously maintain the value of a driving current $I_{uLED}$ supplied during a light emission period of the micro light-emitting element uLED. The first electrode of the driving transistor DR-T may be a source electrode, and the second electrode may be a drain electrode, but the present specification is not limited thereto. In addition, the structure of the pixel driving circuit includes all circuit structures in which a driving current $I_{uLED}$ is supplied to the micro light-emitting element uLED for emission, and the supply time of the driving current $I_{uLED}$ is controlled by the on-pulse width of an emission signal EM to adjust the emission gray level, and is not limited to the circuit structure shown in FIG. 15.

Figure 16:
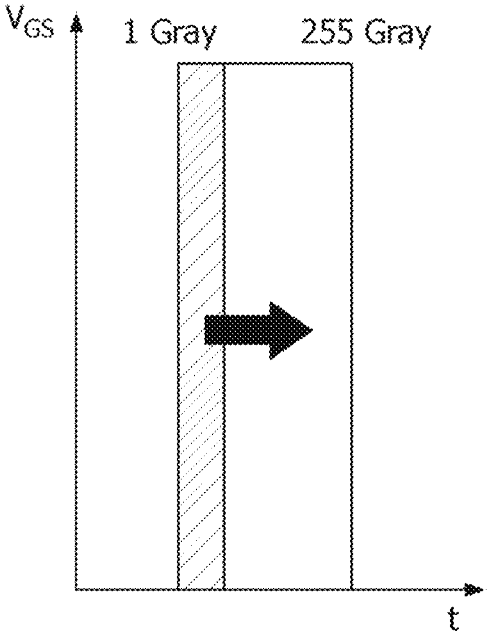
FIG. 16 is a diagram for explaining an emission driving method to which pulse width modulation is applied according to an embodiment of the present specification.

FIG. 16 is a diagram for explaining an emission driving method to which pulse width modulation is applied according to an embodiment of the present specification. In the graph of FIG. 16, the horizontal axis represents time, and the vertical axis represents a gate-source voltage of the driving transistor DR-T.

A fixed driving current is supplied to the micro light-emitting element for light emission, and the emission gray level of the micro LED light-emitting element may be adjusted by controlling the time during which the driving current is supplied through adjustment of the on-pulse width of an emission signal.

Referring also to FIG. 15, in a PWM driving method, the driving current $I_{uLED}$ may be stably supplied to the micro light-emitting element through the voltage charged in the storage capacitor Cst. When the time during which the driving current $I_{uLED}$ is supplied is short, for example, when the on-pulse width of the emission signal EM is narrow, a low gray level and a dark gray level (for example, 1 Gray in FIG. 16) may be represented in the micro light-emitting element uLED. When the time during which the driving current $I_{uLED}$ is supplied is long, for example, when the on-pulse width of the emission signal EM is wide, a high gray level and a bright gray level (for example, 255 Gray in FIG. 16) may be represented in the micro light-emitting element μLED. However, the present specification is not limited thereto.

Figure 17:
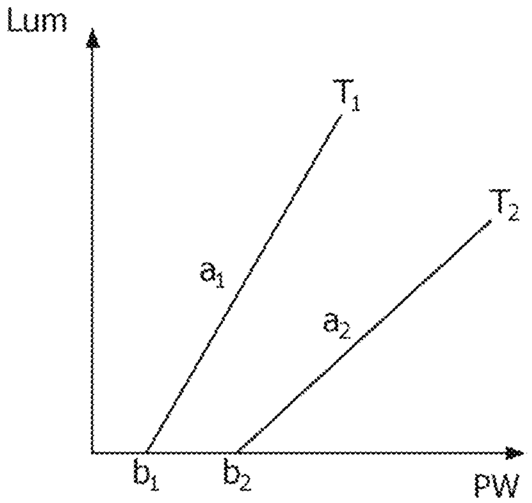
FIG. 17 is a graph of luminance with respect to pulse width at two temperatures according to an embodiment of the present specification.

FIG. 17 is a graph of luminance with respect to pulse width at two temperatures according to an embodiment of the present specification. For reference, in the graphs of the present specification, PW on the horizontal axis is the on-pulse width of the emission signal, and Lum on the vertical axis may be luminance.

In a display apparatus 1000 according to an embodiment of the present specification, optical compensation may be performed. In a PWM driving method, a PWM duty for controlling the emission timing of the micro LED according to luminance may be determined, and a gamma curve may be set in correlation with the PWM duty. The PWM duty is the on-pulse width of the emission signal EM, and the emission time of the micro LED may be proportional to the on-pulse width of the emission signal EM. Therefore, the longer the on-pulse width of the emission signal EM is set, the higher the luminance of the display apparatus may be.

Optical compensation may be performed at room temperature, which is the environment in which the display apparatus 1000 is driven, and based on the compensation values calculated accordingly, the on-pulse width of the emission signal EM may be set according to luminance. In the case of a light-emitting element such as an OLED, in which the variation in optical performance according to temperature change is not large, there is no particular problem in the reliability of the display apparatus even when only the optical compensation performed as described above is applied; however, in the case of a light-emitting element such as a micro LED in which the optical performance is sensitive to temperature change, additional compensation for this may be implemented.

As shown in FIG. 17, luminance according to the on-pulse width of the emission signal EM set through optical compensation may be measured at a first temperature $T_1$ and a second temperature $T_2$ that is higher than the first temperature, and a first linear function graph and a second linear function graph may be generated. In one embodiment, the first temperature $T_1$ may be room temperature, the second temperature $T_2$ may be a high temperature that is higher than the first temperature, and more specifically, may be about 45° C., but is not limited thereto.

Using the slope value $a_1$ and the offset value $b_1$ of the first linear function graph for the first temperature $T_1$, and the slope value $a_2$ and the offset value $b_2$ of the second linear function graph for the second temperature $T_2$, first coefficient values E(T) and offset values E_offset(T) related to temperature, and parameter values $A_T$ and $B_T$ may be calculated. A detailed calculation method for this will be described below.

Figure 18:
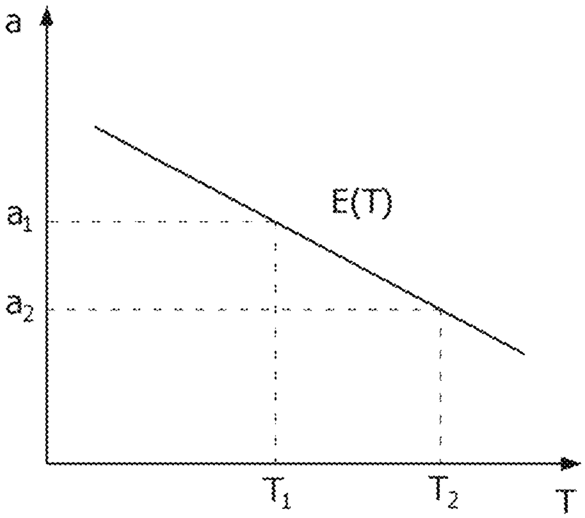
FIG. 18 is a graph illustrating a method of calculating a first coefficient value related to temperature according to an embodiment of the present specification.

FIG. 18 is a graph illustrating a method of calculating a first coefficient value related to temperature according to an embodiment of the present specification. For reference, in the graph of FIG. 18, the horizontal axis represents temperature T, and the vertical axis represents the slope value a of the linear function graph.

The first coefficient value E(T) related to temperature may be calculated through Equation 1 below.

$$E(T) = \frac{a_1 - a_2}{T_1 - T_2} \quad \text{[Equation 1]}$$

Here, $T_1$ is the first temperature, $T_2$ is the second temperature, $a_1$ is the slope value of the first linear function graph for the first temperature, and $a_2$ is the slope value of the second linear function graph for the second temperature. The second temperature may be higher than the first temperature.

In addition, a first parameter value $A_T$ may be calculated through Equation 2 below.

$$A_T = a_1 - E(T) \times T_1 \quad \text{[Equation 2]}$$

Here, $a_1$ is the slope value of the first linear function graph for the first temperature, E(T) is a first coefficient value related to temperature, and $T_1$ is the first temperature.

Figure 19:
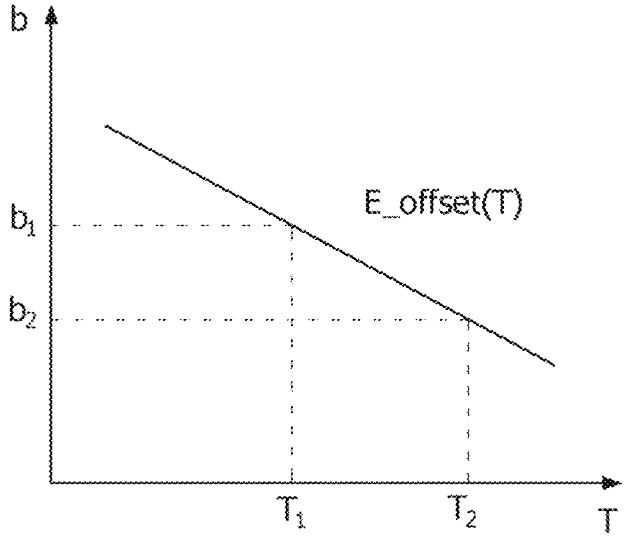
FIG. 19 is a graph illustrating a method of calculating a second coefficient value related to temperature according to an embodiment of the present specification.

FIG. 19 is a graph illustrating a method of calculating a second coefficient value related to temperature according to an embodiment of the present specification. For reference, in the graph of FIG. 19, the horizontal axis represents temperature T, and the vertical axis represents the offset value b of the linear function graph.

A second coefficient value E_offset(T) related to temperature may be calculated through Equation 3 below.

$$\text{E\_offset}(T) = \frac{b_1 - b_2}{T_1 - T_2} \quad \text{[Equation 3]}$$

Here, $T_1$ is the first temperature, $T_2$ is the second temperature, $b_1$ is the offset value of the first linear function graph for the first temperature, and $b_2$ is the offset value of the second linear function graph for the second temperature. The second temperature may be higher than the first temperature.

A second parameter value $B_T$ may be calculated through Equation 4 below.

$$B_T = b_1 - \text{E\_offset}(T) \times T_1 \quad \text{[Equation 4]}$$

Here, $b_1$ is the offset value of the first linear function graph for the first temperature, E_offset(T) is a second coefficient value related to temperature, and $T_1$ is the first temperature.

In the process of performing the temperature compensation method according to an embodiment of the present specification, data may be stored in a memory, and a processor may control the memory to compute the stored data and derive necessary values. The memory and the processor may be electrically connected to one or more flexible circuit boards CB and may be located on a printed circuit board 160 that supplies signals to a drive IC, but are not limited thereto.

Hereinafter, a detailed process of adjusting the on-pulse width of an emission signal using the calculated coefficient values E(T) and E_offset(T) related to temperature, and parameter values $A_T$ and $B_T$ will be described.

Figure 20:
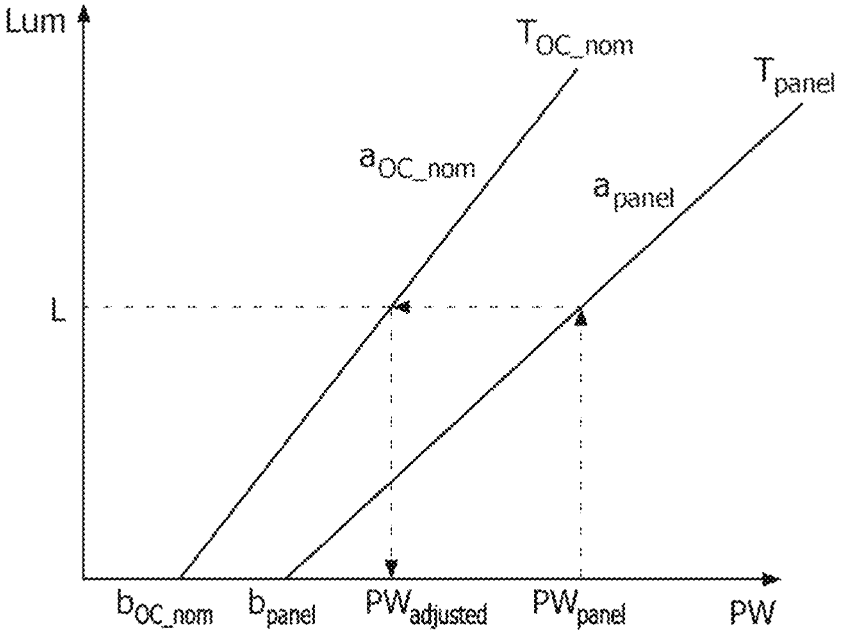
FIG. 20 is a graph illustrating a pulse width compensation method for a target temperature according to an embodiment of the present specification.

FIG. 20 is a graph illustrating a pulse width compensation method for a target temperature according to an embodiment of the present specification. For reference, in the graphs of the present specification, PW on the horizontal axis is the on-pulse width of the emission signal, and Lum on the vertical axis may be luminance.

With respect to the on-pulse width $PW_{panel}$ of the emission signal according to luminance at a temperature $T_{panel}$ at which optical compensation is performed (for example, a predetermined room temperature), the on-pulse width of the emission signal according to luminance at a target temperature $T_{OC\_nom}$, which is a predetermined high temperature, may be adjusted ($PW_{adjusted}$) by applying temperature compensation.

In the present specification, a linear function graph representing the on-pulse width of the emission signal according to luminance at the temperature $T_{panel}$ at which optical compensation is performed may be referred to as a display panel linear function graph, and a linear function graph representing the on-pulse width of the emission signal according to luminance at the target temperature $T_{OC\_nom}$ to which temperature compensation is applied may be referred to as a target linear function graph. The use of these terms is only for the purpose of facilitating understanding of the description, and the content of the present specification is not limited to such naming.

By using the coefficient values E(T) and offset values E_offset(T) related to temperature and the parameter values $A_T$ and $B_T$ calculated through the processes of FIGS. 18 and 19, a display panel linear function graph for the temperature $T_{panel}$ at which optical compensation is performed may be generated, and a target linear function graph for the target temperature $T_{OC\_nom}$ may be calculated. Thereafter, the on-pulse width $PW_{panel}$ of the emission signal from the display panel linear function graph corresponding to the same luminance L may be converted into the on-pulse width $PW_{adjusted}$ of the emission signal from the target linear function graph, so that the on-pulse width $PW_{adjusted}$ of the emission signal to which temperature compensation for the target temperature is applied may be obtained.

First, a slope value $a_{panel}$ and an offset value $b_{panel}$ of the display panel linear function graph may be calculated using the calculated temperature coefficient values E(T) and E_offset(T), and parameter values $A_T$ and $B_T$. The slope value $a_{panel}$ and the offset value $b_{panel}$ of the display panel linear function graph may be calculated through the following equations, respectively.

$$a_{Panel} = E(T) \times T_{Panel} + A_T \quad \text{[Equation 5]}$$

Here, E(T) is a first coefficient value related to temperature, $T_{panel}$ is a temperature at which optical compensation is performed, and $A_T$ is a first parameter value.

$$b_{Panel} = \text{E\_offset}(T) \times T_{Panel} + B_T \quad \text{[Equation 6]}$$

Here, E_offset(T) is a second coefficient value related to temperature, $T_{panel}$ is a temperature at which optical compensation is performed, and $B_T$ is a second parameter value.

Next, based on the calculated slope value $a_{panel}$ and offset value $b_{panel}$ of the display panel linear function graph, the display panel linear function graph for the temperature $T_{panel}$ at which optical compensation is performed may be generated.

Next, the slope value $a_{OC\_nom}$ and the offset value $b_{OC\_nom}$ of the target linear function graph may be calculated using the calculated temperature coefficient values E(T) and E_offset(T), and parameter values $A_T$ and $B_T$. The slope value $a_{OC\_nom}$ and the offset value $b_{OC\_nom}$ of the target linear function graph may be calculated through the following equations, respectively.

$$a_{OC\_nom} = E(T) \times T_{OC\_nom} + A_T \quad \text{[Equation 7]}$$

Here, E(T) is a first coefficient value related to temperature, $T_{OC\_nom}$ is a target temperature, and $A_T$ is a first parameter value.

$$b_{OC\_nom} = \text{E\_offset}(T) \times T_{OC\_nom} + B_T \quad \text{[Equation 8]}$$

Here, E_offset(T) is a second coefficient value related to temperature, $T_{OC\_nom}$ is a target temperature, and $B_T$ is a second parameter value.

Thereafter, based on the calculated slope value $a_{OC\_nom}$ and offset value $b_{OC\_nom}$ of the target (or desired) linear function graph, a target linear function graph for the target temperature $T_{panel}$ to which temperature compensation is applied may be generated.

Referring also to FIG. 20, finally, by converting the on-pulse width $PW_{panel}$ of the emission signal on the display panel linear function graph corresponding to the same luminance L into the on-pulse width $PW_{adjusted}$ of the emission signal on the target linear function graph, the on-pulse width $PW_{adjusted}$ of the emission signal to which temperature compensation for the target temperature (or desired temperature) is applied may be obtained.

The on-pulse width $PW_{adjusted}$ of the emission signal to which temperature compensation for the target temperature is applied may be calculated through Equation 9 below.

$$PW_{adjusted} = b_{OC\_nom} + \frac{a_{Panel}}{a_{OC\_nom}} \times (PW_{Panel} - b_{Panel}) \quad \text{[Equation 9]}$$

Here, $a_{panel}$ and $b_{panel}$ are the slope value and offset value of the display panel linear function graph, $a_{OC\_nom}$ and $b_{OC\_nom}$, are the slope value and offset value of the target linear function graph, and $PW_{panel}$ is the on-pulse width of the emission signal on the display panel linear function graph.

The values of the on-pulse width $PW_{adjusted}$ of the emission signal according to luminance, calculated in this way with temperature compensation applied, may be stored in a memory or stored in a data driver circuit in the form of a lookup table, but are not limited thereto.

The temperature compensation method according to an embodiment of the present specification may be applied to each sub-pixel of red, green, and blue, but is not limited thereto.

Figure 21:
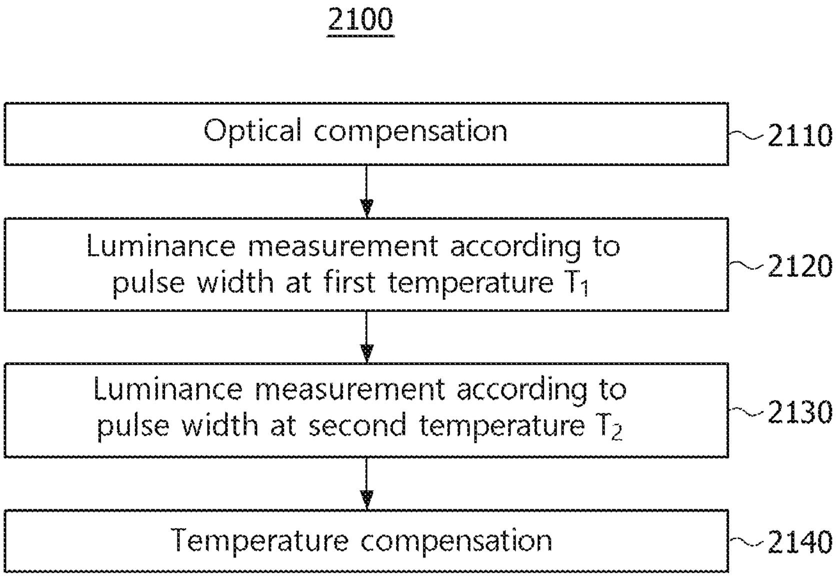
FIG. 21 is a flowchart of a temperature compensation method of a display apparatus according to an embodiment of the present specification.

FIG. 21 is a flowchart of a temperature compensation method of a display apparatus according to an embodiment of the present specification.

A temperature compensation method 2100 of a display apparatus according to an embodiment of the present specification may be described as follows.

In step 2110, the display apparatus 1000 may perform optical compensation at a predetermined room temperature and may set the on-pulse width of the emission signal according to luminance of pixels based on the performed optical compensation. In steps 2120 and 2130, with respect to a first temperature T1 and a second temperature T2, luminance according to the on-pulse width of the set emission signal may be measured, and based on the measured values, first and second linear function graphs for the respective temperatures T1 and T2 may be generated.

From the first and second linear function graphs generated as described above, slope values a1 and a2 and offset values b1 and b2 may be obtained, and based thereon, coefficient values E(T) and E_offset(T) related to temperature, and parameter values $A_T$ and $B_T$ may be calculated. Again, based on the calculated coefficient values E(T) and E_offset(T) related to temperature, and parameter values $A_T$ and $B_T$, a slope value $a_{panel}$ and an offset value $b_{panel}$ of the display panel linear function graph for the temperature $T_{panel}$ at which optical compensation is performed may be calculated, and a slope value $a_{OC\_nom}$ and an offset value $b_{OC\_nom}$ of the linear function graph for the target temperature $T_{OC\_nom}$ to which temperature compensation is applied may be calculated.

In step 2140, the on-pulse width of the emission signal may be adjusted based on the target linear function graph, to apply temperature compensation. A display panel linear function graph for the target temperature $T_{panel}$ at which optical compensation is performed and a target linear function graph for the target temperature TOC nom may be generated. Finally, by converting the on-pulse width $PW_{panel}$ of the emission signal on the display panel linear function graph corresponding to the same luminance into the on-pulse width $PW_{adjusted}$ of the emission signal on the target linear function graph, the on-pulse width $PW_{adjusted}$ of the emission signal to which temperature compensation for the target temperature is applied may be obtained.

FIGS. 22A to 22D and FIGS. 23A and 23B are graphs illustrating, by way of example, changes in pulse width and optical characteristics resulting from the application of the temperature compensation method according to an embodiment of the present specification.

Figure 22A:
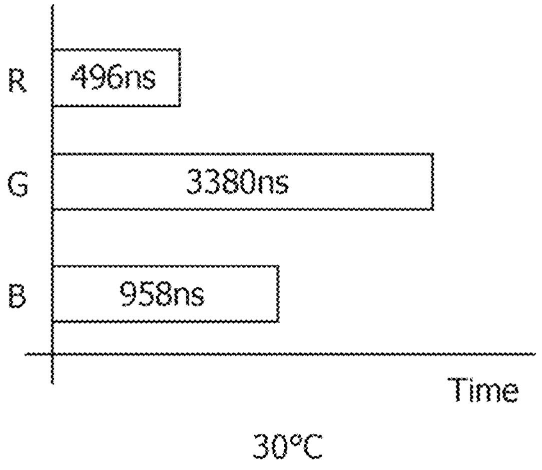
FIGS. 22A to 22D and FIGS. 23A and 23B are graphs illustrating, by way of example, changes in pulse width and optical characteristics resulting from the application of the temperature compensation method according to an embodiment of the present specification.
Figure 22B:
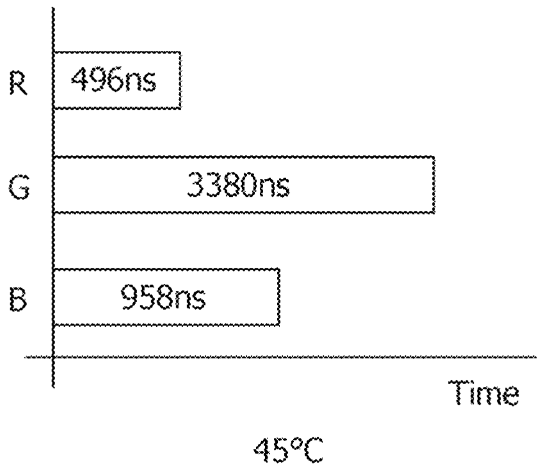
Figure 22C:
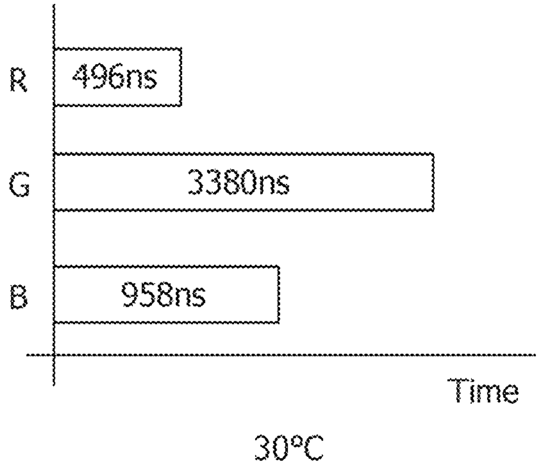
Figure 22D:
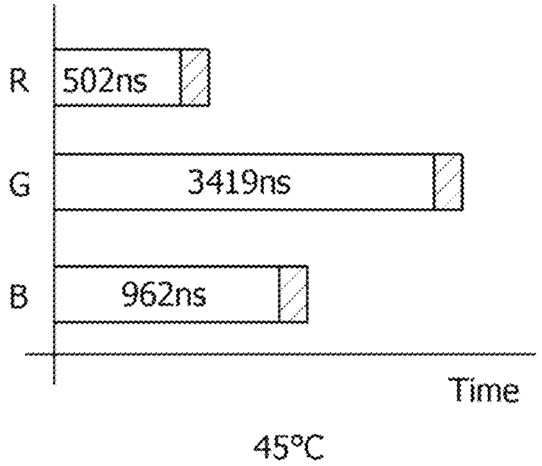

In FIGS. 22A to 22D, the horizontal axis represents time, and the vertical axis represents red R, green G, and blue B sub-pixels. FIGS. 22A and 22C illustrate pulse widths at 30° C., and FIGS. 22B and 22D illustrate pulse widths at 45° C.

Figure 23A:
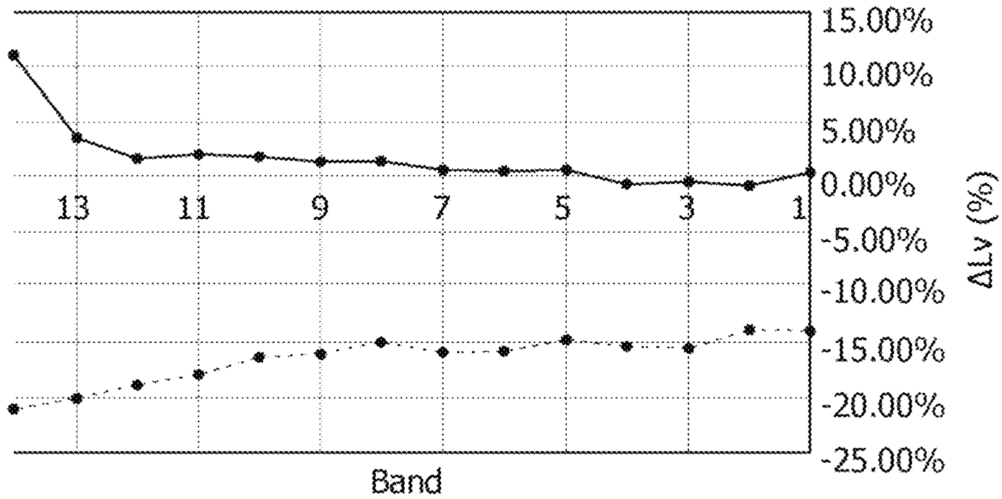
Figure 23B:
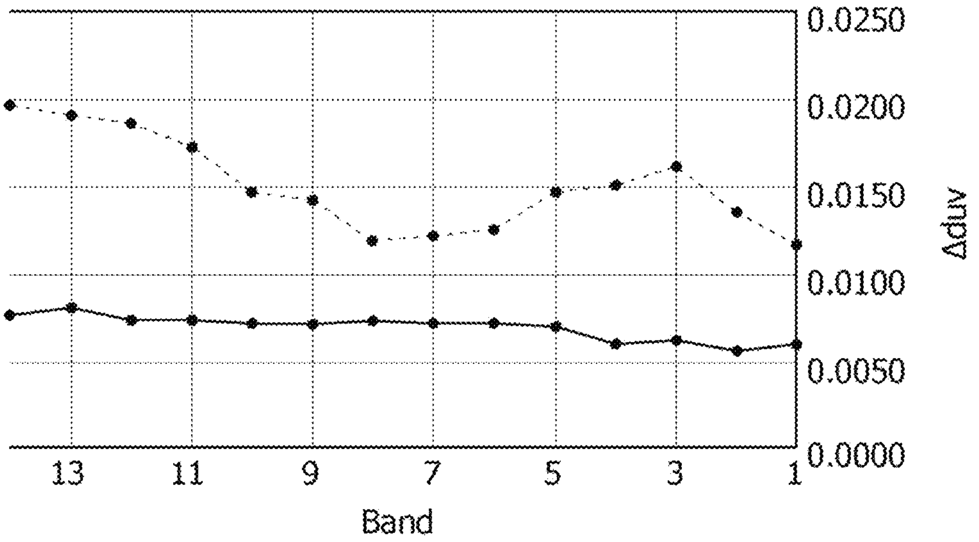

In FIGS. 23A and 23B, the horizontal axis represents a band, which is a luminance mode that controls the luminance of the display panel, the vertical axis in FIG. 23A represents luminance variation ΔLv (%), and the vertical axis in FIG. 23B represents color coordinate variation Δduv.

Referring to FIGS. 22A to 22D, in FIGS. 22A and 22B, where temperature compensation is not applied, there may be no change in the on-pulse width of the emission signal according to a temperature change. In FIGS. 22C and 22D, where temperature compensation is applied, as the operating environment temperature of the display apparatus changes from 30° C. to 45° C., the on-pulse width of the emission signal for each sub-pixel may be changed. By way of example, the emission signal is set to on-pulse widths of 496 ns, 3380 ns, and 958 ns for red R, green G, and blue B sub-pixels, respectively, at 30° C., but at 45° C., due to the application of temperature compensation according to an embodiment of the present specification, the on-pulse widths may be changed and set to 502 ns, 3419 ns, and 962 ns, respectively, for red R, green G, and blue B sub-pixels, increased by the corresponding shaded (hatched) portions. For example, the hatched portion may be the amount of change in the pulse width that has been varied through temperature compensation compared to FIG. 22C.

Referring to FIGS. 23A and 23B, FIG. 23A shows a comparison of the case where temperature compensation is not applied (dotted line) and the case where temperature compensation is applied (solid line) at 45° C. in terms of luminance variation ΔLv, and FIG. 23B shows a comparison of the same in terms of color coordinate variation Δduv. In FIG. 23A, the solid line near 0.00% has a lower luminance variation than the dotted line near −15.00%, and in FIG. 23B, the solid line closer to 0.0000 has a lower color coordinate variation than the dotted line, so it can be confirmed that pixels are stably driven through the application of temperature compensation.

The temperature compensation method according to an embodiment of the present specification may effectively compensate for unintended luminance variation and/or color coordinate variation of the display apparatus in an environment where temperature changes, by measuring luminance variation according to pulse width at room temperature and high temperature, calculating coefficient values related to temperature, and based on the measurement, performing temperature compensation at a target temperature.

A temperature compensation method and a display apparatus according to one or more embodiments of the present specification may be described as follows.

According to one or more embodiments of the present specification, a temperature compensation method may include: setting an on-pulse width of an emission signal according to luminance of pixels based on optical compensation; generating first and second linear function graphs by measuring luminance according to the on-pulse width of the emission signal set at first and second temperatures; generating a target linear function graph relating the on-pulse width of the emission signal set and luminance at a target temperature based on the first and second linear function graphs; and adjusting the on-pulse width of the emission signal set based on the target linear function graph.

According to one or more embodiments of the present specification, the step of generating the target linear function graph may include a step of calculating respective slope values and offset values of the first and second linear function graphs from the first and second linear function graphs, and a step of calculating coefficient values and parameter values related to temperature using the slope values and the offset values.

According to one or more embodiments of the present specification, the step of generating the target linear function graph may include a step of calculating a slope value and an offset value of the target linear function graph using the coefficient values and the parameter values, and a step of generating the target linear function graph using the slope value and the offset value of the target linear function graph.

According to one or more embodiments of the present specification, the step of adjusting the on-pulse width of the emission signal set may include a step of generating a display panel linear function graph relating the on-pulse width of the emission signal set and luminance at a temperature at which optical compensation is performed, based on the first and second linear function graphs; and a step of converting the on-pulse width of the emission signal on the display panel linear function graph for the same luminance into the on-pulse width of the emission signal on the target linear function graph.

According to one or more embodiments of the present specification, the coefficient values related to temperature may include a first coefficient value and a second coefficient value. The first coefficient value may be a value obtained by dividing a difference between a slope value of the first linear function graph and a slope value of the second linear function graph by a difference between the first temperature and the second temperature. The second coefficient value may be a value obtained by dividing a difference between an offset value of the first linear function graph and an offset value of the second linear function graph by a difference between the first temperature and the second temperature. The parameter values related to temperature may include a first parameter value and a second parameter value. The first parameter value may be a value obtained by subtracting a value obtained by multiplying the first coefficient value and the first temperature from the slope value of the first linear function graph. The second parameter value may be a value obtained by subtracting a value obtained by multiplying the second coefficient value and the first temperature from the offset value of the first linear function graph.

According to one or more embodiments of the present specification, the slope value of the target linear function graph may be a value obtained by adding a first parameter value to a value obtained by multiplying a first coefficient value and a target temperature. The offset value of the target linear function graph may be a value obtained by adding a second parameter value to a value obtained by multiplying a second coefficient value and the target temperature.

According to one or more embodiments of the present specification, the slope value of the display panel linear function graph may be a value obtained by adding a first parameter value to a value obtained by multiplying a first coefficient value and a temperature at which optical compensation is performed. The offset value of the display panel linear function graph may be a value obtained by adding a second parameter value to a value obtained by multiplying a second coefficient value and the temperature at which optical compensation is performed.

According to one or more embodiments of the present specification, the temperature at which optical compensation is performed and the first temperature may be room temperature. The second temperature may be a temperature higher than the first temperature.

According to one or more embodiments of the present specification, the temperature at which optical compensation is performed, the first temperature, and the second temperature may be obtained by sensing a temperature inside a display panel of the display apparatus.

According to one or more embodiments of the present specification, the light-emitting elements of the pixels may include micro LEDs.

A display apparatus according to an embodiment of the present specification may include a display panel including pixels, a memory configured to store data, and a processor configured to control the memory and perform computation using the data. The processor may be configured to set an on-pulse width of an emission signal according to luminance of the pixels based on optical compensation, generate first and second linear function graphs by measuring the luminance according to the on-pulse width of the emission signal set at first and second temperatures, generate a target linear function graph relating the on-pulse width of the emission signal set and luminance at a target temperature based on the first and second linear function graphs, and adjust the on-pulse width of the emission signal set based on the target linear function graph.

According to one or more embodiments of the present specification, the processor may be configured to calculate respective slope values and offset values of the first and second linear function graphs from the first and second linear function graphs, and calculate coefficient values and parameter values related to temperature based on the slope values and the offset values.

According to one or more embodiments of the present specification, the processor may be configured to calculate a slope value and an offset value of a target linear function graph using the coefficient values and the parameter values, and generate the target linear function graph using the slope value and the offset value of the target linear function graph.

According to one or more embodiments of the present specification, the processor may be configured to generate a display panel linear function graph relating an on-pulse width of the emission signal set and the luminance at a temperature at which optical compensation is performed, based on the first and second linear function graphs, and convert the on-pulse width of the emission signal on the display panel linear function graph into the on-pulse width of the emission signal on the target linear function graph for the same luminance. The memory may be configured to store the converted on-pulse width of the emission signal corresponding to the luminance.

According to one or more embodiments of the present specification, the coefficient values related to temperature may include a first coefficient value and a second coefficient value. The first coefficient value may be a value obtained by dividing a difference between a slope value of the first linear function graph and a slope value of the second linear function graph by a difference between the first temperature and the second temperature. The second coefficient value may be a value obtained by dividing a difference between an offset value of the first linear function graph and an offset value of the second linear function graph by a difference between the first temperature and the second temperature.

According to one or more embodiments of the present specification, the parameter values related to temperature may include a first parameter value and a second parameter value. The first parameter value may be a value obtained by subtracting a value obtained by multiplying the first coefficient value and the first temperature from the slope value of the first linear function graph. The second parameter value may be a value obtained by subtracting a value obtained by multiplying the second coefficient value and the first temperature from the offset value of the first linear function graph.

According to one or more embodiments of the present specification, the slope value of the target linear function graph may be a value obtained by adding a first parameter value to a value obtained by multiplying a first coefficient value and a target temperature. The offset value of the target linear function graph may be a value obtained by adding a second parameter value to a value obtained by multiplying a second coefficient value and the target temperature.

According to one or more embodiments of the present specification, the slope value of the display panel linear function graph may be a value obtained by adding a first parameter value to a value obtained by multiplying a first coefficient value and a temperature at which optical compensation is performed. The offset value of the display panel linear function graph may be a value obtained by adding a second parameter value to a value obtained by multiplying a second coefficient value and the temperature at which optical compensation is performed.

According to one or more embodiments of the present specification, the temperature at which optical compensation is performed and the first temperature may be room temperature. The second temperature may be a temperature higher than the first temperature.

According to one or more embodiments of the present specification, the temperature at which optical compensation is performed, the first temperature, and the second temperature may be obtained by sensing a temperature inside a display panel.

According to one or more embodiments of the present specification, the light-emitting elements in the pixels may include micro LEDs.

According to one or more embodiments of the present specification, the micro LEDs may have a vertical structure.

Accordingly, the embodiments disclosed herein are to be considered descriptive and not restrictive of the technical spirit of the present disclosure, and the scope of the technical spirit of the present disclosure is not limited by these embodiments.

Accordingly, the embodiments disclosed herein are to be considered descriptive and not restrictive of the technical spirit of the present disclosure, and the scope of the technical spirit of the present disclosure is not limited by these embodiments. Accordingly, the above-described embodiments should be understood to be exemplary and not limiting in any aspect.

LIST OF REFERENCE NUMBERS

| | |
|---|---|
| 100: Display panel | 110: Substrate |
| 120: Cover member | 140: Support substrate |
| CB: Flexible circuit board | 160: Printed circuit board |
| 1000: Display apparatus | |

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A temperature compensation method comprising:

setting an on-pulse width of an emission signal according to luminance of pixels of a display device based on optical compensation;

generating a first linear function graph and a second linear function graph by measuring luminance in relation to the on-pulse width of the emission signal set at first and second temperatures, respectively;

generating a target linear function graph relating the on-pulse width of the emission signal set and a luminance at a target temperature based on the first and second linear function graphs; and adjusting the on-pulse width of the emission signal set based on the target linear function graph.

2. The temperature compensation method according to claim 1, wherein the generating of the target linear function graph includes:

calculating respective slope values and offset values of the first and second linear function graphs from the first and second linear function graphs; and calculating coefficient values and parameter values related to temperature using the slope values and the offset values.

3. The temperature compensation method according to claim 2, wherein the generating of the target linear function graph includes:

calculating a slope value and an offset value of the target linear function graph using the coefficient values and the parameter values; and generating the target linear function graph using the slope value and the offset value of the target linear function graph.

4. The temperature compensation method according to claim 3, wherein the adjusting of the on-pulse width of the emission signal set includes:

generating a display panel linear function graph relating the on-pulse width of the emission signal set and a luminance at a temperature at which the optical compensation is performed, based on the first and second linear function graphs; and converting the on-pulse width of the emission signal set on the display panel linear function graph for the same luminance into the on-pulse width of the emission signal set on the target linear function graph.

5. The temperature compensation method according to claim 4, wherein:

the coefficient values related to temperature include a first coefficient value and a second coefficient value, the first coefficient value is a value obtained by dividing a difference between the slope value of the first linear function graph and the slope value of the second linear function graph by a difference between the first temperature and the second temperature, the second coefficient value is a value obtained by dividing a difference between the offset value of the first linear function graph and the offset value of the second linear function graph by a difference between the first temperature and the second temperature, the parameter values related to temperature include a first parameter value and a second parameter value, the first parameter value is a value obtained by subtracting a value obtained by multiplying the first coefficient value and the first temperature from the slope value of the first linear function graph, and the second parameter value is a value obtained by subtracting a value obtained by multiplying the second coefficient value and the first temperature from the offset value of the first linear function graph.

6. The temperature compensation method according to claim 5, wherein:

the slope value of the target linear function graph is a value obtained by adding the first parameter value to a value obtained by multiplying the first coefficient value and the target temperature, and the offset value of the target linear function graph is a value obtained by adding the second parameter value to a value obtained by multiplying the second coefficient value and the target temperature.

7. The temperature compensation method according to claim 5, wherein:

the slope value of the display panel linear function graph is a value obtained by adding the first parameter value to a value obtained by multiplying the first coefficient value and a temperature at which optical compensation is performed, and the offset value of the display panel linear function graph is a value obtained by adding the second parameter value to a value obtained by multiplying the second coefficient value and the temperature at which optical compensation is performed.

8. The temperature compensation method according to claim 1, wherein a temperature at which the optical compensation is performed and the first temperature are room temperature, and the second temperature is a temperature higher than the first temperature.

9. The temperature compensation method according to claim 8, wherein the temperature at which optical compensation is performed, the first temperature, and the second temperature are obtained by sensing a temperature inside a display panel of the display apparatus.

10. The temperature compensation method according to claim 1, wherein the light-emitting elements of the pixels include micro LEDs.

11. A display apparatus comprising:

a display panel including pixels;

a memory configured to store data; and a processor configured to control the memory and perform computation using the data, wherein the processor is configured to:

set an on-pulse width of an emission signal according to luminance of the pixels based on optical compensation, generate a first linear function graph and a second linear function graph by measuring luminance in relation to the on-pulse width of the emission signal set at first and second temperatures, respectively, generate a target linear function graph relating the on-pulse width of the emission signal set and a luminance at a target temperature based on the first and second linear function graphs, and adjust the on-pulse width of the emission signal set based on the target linear function graph.

12. The display apparatus according to claim 11, wherein the processor is configured to:

calculates respective slope values and offset values of the first and second linear function graphs from the first and second linear function graphs, and calculate coefficient values and parameter values related to temperature based on the slope values and the offset values.

13. The display apparatus according to claim 12, wherein the processor is configured to:

calculate a slope value and an offset value of the target linear function graph using the coefficient values and the parameter values, and generate the target linear function graph using the slope value and the offset value of the target linear function graph.

14. The display apparatus according to claim 13, wherein the processor is configured to:

generate a display panel linear function graph relating the on-pulse width of the emission signal set and a luminance at a temperature at which the optical compensation is performed, based on the first and second linear function graphs, and convert the on-pulse width of the emission signal on the display panel linear function graph for the same luminance into the on-pulse width of the emission signal on the target linear function graph, and wherein the memory is configured to:

store the converted on-pulse width of the emission signal corresponding to the luminance.

15. The display apparatus according to claim 14, wherein the coefficient values related to temperature include a first coefficient value and a second coefficient value, the first coefficient value is a value obtained by dividing a difference between the slope value of the first linear function graph and the slope value of the second linear function graph by a difference between the first temperature and the second temperature, the second coefficient value is a value obtained by dividing a difference between the offset value of the first linear function graph and the offset value of the second linear function graph by a difference between the first temperature and the second temperature, the parameter values related to temperature include a first parameter value and a second parameter value, the first parameter value is a value obtained by subtracting a value obtained by multiplying the first coefficient value and the first temperature from the slope value of the first linear function graph, and the second parameter value is a value obtained by subtracting a value obtained by multiplying the second coefficient value and the first temperature from the offset value of the first linear function graph.

16. The display apparatus according to claim 15, wherein the slope value of the target linear function graph is a value obtained by adding the first parameter value to a value obtained by multiplying the first coefficient value and the target temperature, and the offset value of the target linear function graph is a value obtained by adding the second parameter value to a value obtained by multiplying the second coefficient value and the target temperature.

17. The display apparatus according to claim 15, wherein the slope value of the display panel linear function graph is a value obtained by adding the first parameter value to a value obtained by multiplying the first coefficient value and a temperature at which optical compensation is performed, and the offset value of the display panel linear function graph is a value obtained by adding the second parameter value to a value obtained by multiplying the second coefficient value and the temperature at which the optical compensation is performed.

18. The display apparatus according to claim 11, wherein the temperature at which optical compensation is performed and the first temperature are room temperature, and the second temperature is a temperature higher than the first temperature.

19. The display apparatus according to claim 18, wherein the temperature at which the optical compensation is performed, the first temperature, and the second temperature are obtained by sensing a temperature inside the display panel.

20. The display apparatus according to claim 11, wherein the light-emitting elements in the pixels include micro LEDs.

21. The display apparatus according to claim 20, wherein the micro LEDs have a vertical structure.

* * * * *